(12) United States Patent
Hodges et al.

(10) Patent No.: US 10,158,148 B2
(45) Date of Patent: Dec. 18, 2018

(54) DYNAMICALLY CHANGING INTERNAL STATE OF A BATTERY

(71) Applicant: Microsoft Technology Licensing, LLC, Redmond, WA (US)

(72) Inventors: Stephen E. Hodges, Cambridge (GB); Ranveer Chandra, Bellevue, WA (US); Julia L. Meinershagen, Seattle, WA (US); Nissanka Arachchige Bodhi Priyantha, Redmond, WA (US); Anirudh Badam, Redmond, WA (US); Thomas Moscibroda, Beijing (CN); Anthony John Ferrese, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 289 days.

(21) Appl. No.: 14/624,808

(22) Filed: Feb. 18, 2015

(65) Prior Publication Data

US 2016/0240891 A1    Aug. 18, 2016

(51) Int. Cl.

| | |
|---|---|
| *H01M 10/052* | (2010.01) |
| *H01M 10/42* | (2006.01) |
| *H01M 10/615* | (2014.01) |
| *H01M 10/623* | (2014.01) |
| *H01M 10/625* | (2014.01) |
| *H01M 4/36* | (2006.01) |

(Continued)

(52) U.S. Cl.
CPC ......... *H01M 10/425* (2013.01); *H01M 4/364* (2013.01); *H01M 4/62* (2013.01); *H01M 10/049* (2013.01); *H01M 10/4235* (2013.01); *H01M 10/615* (2015.04); *H01M 10/623* (2015.04); *H01M 10/625* (2015.04); *H01M 4/13* (2013.01); *H01M 4/139* (2013.01); *H01M 10/052* (2013.01); *H01M 10/44* (2013.01); *H01M 2010/4271* (2013.01); *H01M 2220/20* (2013.01); *H01M 2220/30* (2013.01)

(58) Field of Classification Search
CPC .................. H01M 10/052; H01M 10/0525
See application file for complete search history.

(56) References Cited

U.S. PATENT DOCUMENTS

| | | |
|---|---|---|
| 4,145,669 A | 3/1979 | Babcock et al. |
| 5,091,819 A | 2/1992 | Christensen et al. |

(Continued)

FOREIGN PATENT DOCUMENTS

| | | |
|---|---|---|
| CN | 101714629 | 5/2010 |
| CN | 101834320 | 9/2010 |

(Continued)

OTHER PUBLICATIONS

"International Search Report and Written Opinion", Application No. PCT/US2015/026052, dated Jul. 23, 2015, 10 pages.

(Continued)

*Primary Examiner* — Olatunji A Godo
(74) *Attorney, Agent, or Firm* — Schwegman Lundberg & Woessner, P.A.

(57) ABSTRACT

Techniques for dynamically changing internal state of a battery are described herein. Generally, different battery configurations are described that enable transitions between different battery power states, such as to accommodate different battery charge and/or discharge scenarios.

20 Claims, 8 Drawing Sheets

(51) Int. Cl.
H01M 4/62 (2006.01)
H01M 10/04 (2006.01)
H01M 4/13 (2010.01)
H01M 4/139 (2010.01)
H01M 10/44 (2006.01)

(56) References Cited

U.S. PATENT DOCUMENTS

| | | | |
|---|---|---|---|
| 5,315,228 A | 5/1994 | Hess et al. |
| 5,519,261 A | 5/1996 | Stewart |
| 5,543,245 A | 8/1996 | Andrieu et al. |
| 5,614,332 A | 3/1997 | Pavelle et al. |
| 5,684,404 A | 11/1997 | Millar |
| 5,691,742 A | 11/1997 | O'Connor et al. |
| 5,693,010 A | 12/1997 | Ledger et al. |
| 5,705,929 A | 1/1998 | Caravello et al. |
| 5,764,032 A | 6/1998 | Moore |
| 5,818,200 A | 10/1998 | Cummings et al. |
| 5,894,212 A | 4/1999 | Balogh |
| 5,914,585 A | 6/1999 | Grabon |
| 5,963,010 A | 10/1999 | Hayashi et al. |
| 6,139,987 A | 10/2000 | Koo et al. |
| 6,154,012 A | 11/2000 | Drori |
| 6,252,511 B1 | 6/2001 | Mondshine et al. |
| 6,258,473 B1 | 7/2001 | Spillman et al. |
| 6,268,711 B1 | 7/2001 | Bearfield |
| 6,299,998 B1 | 10/2001 | Morris et al. |
| 6,346,794 B1 | 2/2002 | Odaohhara |
| 6,353,304 B1 | 3/2002 | Atcitty et al. |
| 6,417,646 B1 | 7/2002 | Huykman et al. |
| 6,463,495 B1 | 10/2002 | Angelo et al. |
| 6,650,089 B1 | 11/2003 | Freeman et al. |
| 6,710,578 B1 | 3/2004 | Sklovsky |
| 6,771,044 B1 | 8/2004 | Vinciguerra et al. |
| 6,833,792 B1 | 12/2004 | Smith et al. |
| 6,847,191 B1 | 1/2005 | Wang |
| 6,920,404 B2 | 7/2005 | Yamanaka |
| RE38,918 E | 12/2005 | Svensson et al. |
| 6,977,479 B2 | 12/2005 | Hsu |
| 6,992,580 B2 | 1/2006 | Kotzin et al. |
| 7,015,596 B2 | 3/2006 | Pail |
| 7,020,500 B2 | 3/2006 | Saghbini |
| 7,059,769 B1 | 6/2006 | Potega |
| 7,193,334 B2 | 3/2007 | Hiramitsu et al. |
| 7,333,998 B2 | 2/2008 | Heckerman et al. |
| 7,339,348 B2 | 3/2008 | Bui et al. |
| 7,339,353 B1 | 3/2008 | Masias et al. |
| 7,383,451 B2 | 6/2008 | Matsushima et al. |
| 7,415,623 B2 | 8/2008 | Rapps et al. |
| 7,430,675 B2 | 9/2008 | Lee |
| 7,430,679 B2 | 9/2008 | Tevanian, Jr. |
| 7,475,267 B1 | 1/2009 | Cocosel |
| 7,531,989 B2 | 5/2009 | Maireanu |
| 7,574,661 B2 | 8/2009 | Matsuura et al. |
| 7,583,951 B2 | 9/2009 | Gibbs |
| 7,684,942 B2 | 3/2010 | Yun et al. |
| 7,716,500 B2 | 5/2010 | Esliger |
| 7,734,317 B2 | 6/2010 | Patel et al. |
| 7,787,405 B2 | 8/2010 | Dettinger et al. |
| 7,814,348 B2 | 10/2010 | Krajcovic et al. |
| 7,839,121 B2 | 11/2010 | Kim |
| 7,944,662 B2 | 5/2011 | Carkner et al. |
| 8,001,400 B2 | 8/2011 | Fadell |
| 8,001,407 B2 | 8/2011 | Malone et al. |
| 8,032,317 B2 | 10/2011 | Houston et al. |
| 8,063,606 B2 | 11/2011 | Veselic |
| 8,097,355 B2 | 1/2012 | Larsen |
| 8,138,726 B2 | 3/2012 | Partin et al. |
| 8,255,716 B2 | 8/2012 | Mandyam |
| 8,258,748 B2 | 9/2012 | Constien et al. |
| 8,313,864 B2 | 11/2012 | Christensen et al. |
| 8,330,419 B2 | 12/2012 | Kim et al. |
| 8,369,904 B2 | 2/2013 | Bennis et al. |
| 8,386,816 B2 | 2/2013 | Elsilä et al. |
| 8,386,826 B2 | 2/2013 | Newman |
| 8,405,332 B1 | 3/2013 | Krishnamoorthy et al. |
| 8,423,306 B2 | 4/2013 | Duncan |
| 8,427,106 B2 | 4/2013 | Kim et al. |
| 8,456,136 B2 | 6/2013 | Kim et al. |
| 8,471,521 B2 | 6/2013 | Stewart et al. |
| 8,482,254 B2 | 7/2013 | Ho |
| 8,487,473 B2 | 7/2013 | Peterson et al. |
| 8,508,191 B2 | 8/2013 | Kim et al. |
| 8,538,686 B2 | 9/2013 | Gruen et al. |
| 8,594,648 B2 | 11/2013 | Musial et al. |
| 8,598,838 B2 | 12/2013 | Cunico |
| 8,598,849 B2 | 12/2013 | Bhardwaj et al. |
| 8,607,036 B2 | 12/2013 | More et al. |
| 8,624,560 B2 | 1/2014 | Ungar et al. |
| 8,629,652 B2 | 1/2014 | Partovi et al. |
| 8,648,493 B2 | 2/2014 | Park |
| 8,648,567 B2 | 2/2014 | Hoffman |
| 8,665,214 B2 | 3/2014 | Forutanpour et al. |
| 8,686,693 B2 | 4/2014 | Bhowmik et al. |
| 8,732,487 B2 | 5/2014 | Goraczko et al. |
| 8,749,193 B1 | 6/2014 | Sullivan |
| 8,751,845 B2 | 6/2014 | Assad et al. |
| 8,768,567 B2 | 7/2014 | Diab |
| 8,795,875 B2 | 8/2014 | Lee et al. |
| 8,803,479 B2 | 8/2014 | Kim |
| 8,805,764 B1 | 8/2014 | Rhines et al. |
| 8,829,847 B2 | 9/2014 | Eaton et al. |
| 8,833,667 B2 | 9/2014 | Ahn et al. |
| 8,847,551 B2 | 9/2014 | Coe et al. |
| 8,898,485 B2 | 11/2014 | Scott et al. |
| 8,922,329 B2 | 12/2014 | Davis et al. |
| 8,949,629 B2 | 2/2015 | Chakra et al. |
| 8,958,854 B1 | 2/2015 | Morley et al. |
| 8,962,188 B2 | 2/2015 | Zhamu et al. |
| 9,285,851 B2 | 3/2016 | Hodges et al. |
| 9,475,398 B2 | 10/2016 | Borhan et al. |
| 9,696,782 B2 | 7/2017 | Chandra et al. |
| 9,748,765 B2 | 8/2017 | Huang et al. |
| 9,760,138 B2 | 9/2017 | Huang et al. |
| 9,793,570 B2 | 10/2017 | Chandra et al. |
| 9,939,862 B2 | 4/2018 | Badam et al. |
| 10,061,366 B2 | 8/2018 | Badam et al. |
| 2001/0010456 A1 | 8/2001 | Kaite et al. |
| 2001/0013767 A1 | 8/2001 | Takemoto |
| 2001/0044332 A1 | 11/2001 | Yamada et al. |
| 2002/0155327 A1 | 10/2002 | Faris |
| 2003/0117143 A1 | 6/2003 | Okada |
| 2003/0149904 A1 | 8/2003 | Kim |
| 2004/0003300 A1 | 1/2004 | Malueg et al. |
| 2004/0095096 A1 | 5/2004 | Melton et al. |
| 2004/0101744 A1 | 5/2004 | Suzuki |
| 2004/0198468 A1 | 10/2004 | Patel et al. |
| 2004/0204183 A1 | 10/2004 | Lencevicius |
| 2005/0189949 A1 | 9/2005 | Shimizu et al. |
| 2005/0258686 A1 | 11/2005 | Hiramitsu et al. |
| 2006/0028167 A1 | 2/2006 | Czubay et al. |
| 2006/0066285 A1 | 3/2006 | Minamiura |
| 2006/0087291 A1 | 4/2006 | Yamauchi |
| 2006/0176017 A1 | 8/2006 | Waguespack |
| 2006/0187072 A1 | 8/2006 | Bruce et al. |
| 2006/0284618 A1 | 12/2006 | Cho, II et al. |
| 2007/0007823 A1 | 1/2007 | Huang et al. |
| 2007/0050647 A1 | 3/2007 | Conroy |
| 2007/0103114 A1 | 5/2007 | Hoffman |
| 2007/0252552 A1 | 11/2007 | Walrath |
| 2008/0024007 A1 | 1/2008 | Budampati et al. |
| 2008/0075367 A1 | 3/2008 | Winn et al. |
| 2008/0082851 A1 | 4/2008 | Zettler |
| 2008/0137989 A1 | 6/2008 | Ng et al. |
| 2008/0176608 A1 | 7/2008 | Budampati et al. |
| 2008/0201587 A1 | 8/2008 | Lee |
| 2008/0218125 A1 | 9/2008 | Bansal et al. |
| 2008/0234956 A1 | 9/2008 | Mizuno et al. |
| 2008/0263375 A1 | 10/2008 | Sundstrom et al. |
| 2009/0006878 A1 | 1/2009 | Borghetti et al. |
| 2009/0007128 A1 | 1/2009 | Borghetti et al. |
| 2009/0016765 A1 | 1/2009 | Honda |
| 2009/0018785 A1 | 1/2009 | Huseth et al. |
| 2009/0085553 A1 | 4/2009 | Kumar et al. |

(56) References Cited

U.S. PATENT DOCUMENTS

| | | |
|---|---|---|
| 2009/0295397 A1 | 12/2009 | Barsukov |
| 2010/0070334 A1 | 3/2010 | Monteverde |
| 2010/0106994 A1 | 4/2010 | Challener et al. |
| 2010/0121587 A1 | 5/2010 | Vian et al. |
| 2010/0121588 A1 | 5/2010 | Elder et al. |
| 2010/0123436 A1 | 5/2010 | Herrod et al. |
| 2010/0164430 A1 | 7/2010 | Lu et al. |
| 2010/0174928 A1 | 7/2010 | Borghetti et al. |
| 2010/0201320 A1 | 8/2010 | Coe et al. |
| 2010/0213897 A1 | 8/2010 | Tse |
| 2010/0235007 A1 | 9/2010 | Constien et al. |
| 2010/0304207 A1 | 12/2010 | Krammer |
| 2010/0332876 A1 | 12/2010 | Fields et al. |
| 2011/0016333 A1 | 1/2011 | Scott et al. |
| 2011/0018679 A1 | 1/2011 | Davis et al. |
| 2011/0025258 A1 | 2/2011 | Kim et al. |
| 2011/0025259 A1 | 2/2011 | Toya et al. |
| 2011/0057617 A1 | 3/2011 | Finberg et al. |
| 2011/0115830 A1 | 5/2011 | Lee et al. |
| 2011/0161690 A1 | 6/2011 | Lin et al. |
| 2011/0171502 A1 | 7/2011 | Kottenstette et al. |
| 2011/0181242 A1 | 7/2011 | Lee |
| 2011/0187309 A1 | 8/2011 | Chan et al. |
| 2011/0234166 A1 | 9/2011 | Liu |
| 2011/0250512 A1 | 10/2011 | Friesen et al. |
| 2011/0260686 A1 | 10/2011 | Ford |
| 2011/0264899 A1 | 10/2011 | Evans et al. |
| 2011/0309838 A1 | 12/2011 | Lin |
| 2012/0004875 A1 | 1/2012 | Maeda et al. |
| 2012/0018679 A1 | 1/2012 | Davis et al. |
| 2012/0040210 A1 | 2/2012 | Hermann |
| 2012/0046892 A1 | 2/2012 | Fink |
| 2012/0047379 A1 | 2/2012 | Chen et al. |
| 2012/0058805 A1 | 3/2012 | Yoo |
| 2012/0074893 A1 | 3/2012 | Cole |
| 2012/0079357 A1 | 3/2012 | Salsbery et al. |
| 2012/0098705 A1 | 4/2012 | Yost et al. |
| 2012/0102407 A1 | 4/2012 | Benario |
| 2012/0102504 A1 | 4/2012 | Iyer |
| 2012/0109519 A1 | 5/2012 | Uyeki |
| 2012/0119705 A1 | 5/2012 | Eberhard et al. |
| 2012/0119746 A1 | 5/2012 | Macris |
| 2012/0144215 A1 | 6/2012 | Naffziger et al. |
| 2012/0144221 A1 | 6/2012 | Naffziger et al. |
| 2012/0150247 A1 | 6/2012 | Meier et al. |
| 2012/0153899 A1 | 6/2012 | Marschalkowski et al. |
| 2012/0188714 A1 | 7/2012 | Von Borck et al. |
| 2012/0309455 A1 | 12/2012 | Klose et al. |
| 2012/0319652 A1 | 12/2012 | Namou et al. |
| 2012/0324578 A1 | 12/2012 | Seinfeld et al. |
| 2012/0326671 A1 | 12/2012 | Krause |
| 2013/0009604 A1 | 1/2013 | Bhardwaj et al. |
| 2013/0032579 A1 | 2/2013 | Barozzi |
| 2013/0038274 A1 | 2/2013 | Forsythe |
| 2013/0043827 A1 | 2/2013 | Weinstein et al. |
| 2013/0099746 A1 | 4/2013 | Nork et al. |
| 2013/0106357 A1 | 5/2013 | Girard et al. |
| 2013/0140902 A1 | 6/2013 | Rich et al. |
| 2013/0143100 A1 | 6/2013 | Bennis et al. |
| 2013/0162430 A1 | 6/2013 | Scherzer et al. |
| 2013/0181511 A1 | 7/2013 | Stewart et al. |
| 2013/0191625 A1 | 7/2013 | Mullens et al. |
| 2013/0191662 A1 | 7/2013 | Ingrassia, Jr. et al. |
| 2013/0221926 A1 | 8/2013 | Furtner |
| 2013/0226486 A1 | 8/2013 | Henderson et al. |
| 2013/0257377 A1 | 10/2013 | Diamond et al. |
| 2013/0262899 A1 | 10/2013 | Frantz et al. |
| 2013/0275794 A1 | 10/2013 | Annavaram et al. |
| 2013/0325379 A1 | 12/2013 | Nakamura |
| 2013/0346001 A1 | 12/2013 | Park et al. |
| 2013/0346762 A1 | 12/2013 | Hodges et al. |
| 2014/0015488 A1 | 1/2014 | Despesse |
| 2014/0021887 A1 | 1/2014 | Keily et al. |
| 2014/0038054 A1 | 2/2014 | Tojigamori et al. |
| 2014/0043010 A1 | 2/2014 | Salem |
| 2014/0062388 A1 | 3/2014 | Kim |
| 2014/0082384 A1 | 3/2014 | De Cesare et al. |
| 2014/0093779 A1 | 4/2014 | Myung et al. |
| 2014/0095003 A1 | 4/2014 | Phillips et al. |
| 2014/0125344 A1 | 5/2014 | Knight et al. |
| 2014/0155100 A1 | 6/2014 | Baldasare et al. |
| 2014/0162112 A1 | 6/2014 | Ugaji et al. |
| 2014/0181551 A1 | 6/2014 | Rahal-Arabi et al. |
| 2014/0186700 A1 | 7/2014 | Bae et al. |
| 2014/0191693 A1 | 7/2014 | Funaba et al. |
| 2014/0203780 A1 | 7/2014 | Hu et al. |
| 2014/0253023 A1 | 9/2014 | Paryani |
| 2014/0265604 A1 | 9/2014 | Mergener |
| 2014/0266061 A1 | 9/2014 | Wachal |
| 2014/0278074 A1 | 9/2014 | Annapureddy et al. |
| 2014/0288737 A1 | 9/2014 | Ryu et al. |
| 2014/0312828 A1 | 10/2014 | Vo et al. |
| 2014/0375252 A1 | 12/2014 | Ford |
| 2014/0376137 A1 | 12/2014 | Wang et al. |
| 2015/0004473 A1 | 1/2015 | Lim et al. |
| 2015/0020016 A1 | 1/2015 | Hanumara et al. |
| 2015/0084602 A1 | 3/2015 | Sawyers et al. |
| 2015/0089261 A1 | 3/2015 | Segawa et al. |
| 2015/0125743 A1* | 5/2015 | Edwards ............ H01M 4/02 429/209 |
| 2015/0188188 A1 | 7/2015 | Zhang et al. |
| 2015/0194707 A1 | 7/2015 | Park |
| 2015/0207344 A1 | 7/2015 | Wang et al. |
| 2015/0309547 A1 | 10/2015 | Huang et al. |
| 2015/0329003 A1 | 11/2015 | Li et al. |
| 2015/0339415 A1 | 11/2015 | Klein et al. |
| 2015/0351037 A1 | 12/2015 | Brown et al. |
| 2016/0066266 A1 | 3/2016 | Law et al. |
| 2016/0114696 A1 | 4/2016 | Eifert et al. |
| 2016/0231387 A1 | 8/2016 | Hodges et al. |
| 2016/0231801 A1 | 8/2016 | Chandra et al. |
| 2016/0240891 A1 | 8/2016 | Hodges et al. |
| 2016/0241048 A1 | 8/2016 | Badam et al. |
| 2016/0248125 A1 | 8/2016 | Huang et al. |
| 2016/0248266 A1 | 8/2016 | Ferrese et al. |
| 2016/0254664 A1 | 9/2016 | Huang et al. |
| 2016/0275400 A1 | 9/2016 | Hodges et al. |
| 2017/0108906 A1 | 4/2017 | Chandra et al. |
| 2017/0139459 A1 | 5/2017 | Badam et al. |
| 2017/0139465 A1 | 5/2017 | Badam |
| 2017/0162899 A1 | 6/2017 | Chandra et al. |
| 2017/0269670 A1 | 9/2017 | Chandra et al. |
| 2017/0317493 A1 | 11/2017 | Huang et al. |
| 2017/0331138 A1 | 11/2017 | Kamiya et al. |
| 2018/0095141 A1 | 4/2018 | Wild et al. |

FOREIGN PATENT DOCUMENTS

| | | |
|---|---|---|
| CN | 102230953 | 11/2011 |
| CN | 202424488 | 9/2012 |
| CN | 103226184 | 7/2013 |
| CN | 103683255 | 3/2014 |
| DE | 102012209660 A1 | 12/2013 |
| EP | 1798100 | 6/2007 |
| EP | 1906295 | 4/2008 |
| EP | 2296246 | 3/2011 |
| EP | 2590050 | 5/2013 |
| EP | 2682840 | 1/2014 |
| GB | 2446168 | 8/2008 |
| JP | H0410366 | 1/1992 |
| JP | H0684544 | 3/1994 |
| JP | 2009278754 | 11/2009 |
| JP | 2010067436 | 3/2010 |
| JP | 2012243463 | 12/2012 |
| KR | 20070095689 | 10/2007 |
| KR | 20090064813 | 6/2009 |
| KR | 20140140906 | 12/2014 |
| WO | WO-9401914 | 1/1994 |
| WO | WO-9933124 | 7/1999 |
| WO | WO-03021409 | 3/2003 |
| WO | WO-2007127788 | 11/2007 |
| WO | WO-2008133951 | 11/2008 |
| WO | WO-2011127251 | 10/2011 |
| WO | WO-2012109048 | 8/2012 |

(56) References Cited

FOREIGN PATENT DOCUMENTS

| WO | WO-2012140401 | 10/2012 |
| WO | WO-2013019899 | 2/2013 |
| WO | WO-2013052678 | 4/2013 |
| WO | WO-2013060802 | 5/2013 |
| WO | WO-2013145000 | 10/2013 |
| WO | WO 2013163695 A1 * | 11/2013 |
| WO | WO-2014098037 | 6/2014 |
| WO | WO-2015029332 | 3/2015 |
| WO | WO-2015123290 | 8/2015 |
| WO | WO-2016149702 | 9/2016 |
| WO | WO-2016197109 | 12/2016 |

OTHER PUBLICATIONS

"Notice of Allowance", U.S. Appl. No. 13/530,130, dated Nov. 6, 2015, 5 pages.
"International Search Report and Written Opinion", Application No. PCT/US2016/016037, dated Apr. 8, 2016, 10 pages.
"International Search Report and Written Opinion", Application No. PCT/US2016/016033, dated May 9, 2016, 10 pages.
"International Search Report and Written Opinion", Application No. PCT/US2016/016671, dated May 11, 2016, 10 pages.
"International Search Report and Written Opinion", Application No. PCT/US2016/015493, dated Apr. 4, 2016, 11 pages.
"International Search Report and Written Opinion", Application No. PCT/US2016/016034, dated Apr. 14, 2016, 16 pages.
"International Preliminary Report on Patentability", Application No. PCT/US2016/016033, dated Nov. 7, 2016, 6 pages.
"International Preliminary Report on Patentability", Application No. PCT/US2015/026052, dated Jul. 27, 2016, 8 pages.
"Non-Final Office Action", U.S. Appl. No. 14/624,825, dated Nov. 18, 2016, 33 pages.
"Non-Final Office Action", U.S. Appl. No. 14/633,009, dated Dec. 1, 2016, 7 pages.
"Second Written Opinion", Application No. PCT/US2016/016670, dated Nov. 18, 2016, 6 pages.
"Final Office Action", U.S. Appl. No. 14/617,719, dated Dec. 12, 2016, 10 pages.
"International Preliminary Report on Patentability", Application No. PCT/US2016/016037, dated Nov. 24, 2016, 6 pages.
"International Search Report and Written Opinion", Application No. PCT/US2016/055238, dated Jan. 19, 2017, 11 pages.
"Non-Final Office Action", U.S. Appl. No. 14/262,205, dated Dec. 23, 2016, 6 pages.
"Non-Final Office Action", U.S. Appl. No. 14/626,600, dated Feb. 13, 2017, 27 pages.
"Non-Final Office Action", U.S. Appl. No. 14/943,967, dated Jan. 3, 2017, 11 pages.
"Second Written Opinion", Application No. PCT/US2016/016034, dated Jan. 17, 2017, 8 pages.
"Anker", Retrieved on: Aug. 13, 2015—Available at: http://www.ianker.com/ExternalBatteries/category-c1-s1, 9 pages.
"Arbin BT-2000 Battery Testing Equipment", Retrieved on: Aug. 13, 2015—Available at: http://www.arbin.com/products/battery, 2 pages.
"Battery and Power Subsystem Hardware Design", Retrieved From: <https://msdn.microsoft.com/en-us/library/windows/hardware/dn481323(v=vs.85).aspx> Aug. 5, 2015, Jun. 30, 2014, 4 pages.
"Battery Anodes", Retrieved on Sep. 23, 2015 Available at: http://www.emc2.cornell.edu/content/view/battery-anodes.html, 8 pages.
"DS2782 Stand-Alone Fuel Gauge IC", Retrieved From: <http://www.maximintegrated.com/en/products/power/battery-management/DS2782.html/tb_tab0> Aug. 6, 2015, 3 pages.
"Google Now", Retrieved on: Aug. 13, 2015—Available at: http://www.google.com/landing/now/, 1 page.
"Hey Siri, what's the Best Sushi Place in Town?", Retrieved on: Aug. 13, 2015—Available at: https://www.apple.com/ios/siri/, 5 pages.
"iFixit iPad Air 2 Teardown", Retrieved on: Aug. 13, 2015—Available at: https://www.ifixit.com/Teardown/iPad+Air+2+Teardown/30592, 12 pages.
"iFixit Microsoft Surface Pro 3 Teardown", Retrieved on: Aug. 13, 2015—Available at: https://www.ifixit.com/Teardown/Microsoft+Surface+Pro+3+Teardown/26595, 17 pages.
"iFixit Samsung Galaxy Note 10.1 Teardown", Retrieved on: Aug. 13, 2015—Available at: https://www.ifixit.com/Teardown/Samsung+Galaxy+Note+10.1+Teardown/10144, 13 pages.
"MacBook", Retrieved on: Aug. 13, 2015—Available at: http://www.apple.com/macbook/design/, 14 pages.
"MACCOR-Model 4200", Retrieved on: Aug. 13, 2015—Available at: http://www.maccor.com/Products/Model4200.aspx, 2 pages.
"Maxim-Parametric Search Product Table", Retrieved on: Aug. 13, 2015—Available at: http://para.maximintegrated.com/en/results.mvp?fam=batt_stat295=Fuel%26nbsp%3BGauge&1379=ModelGauge, 2 pages.
"Mophie Juice Pack Helium", Retrieved on: Aug. 13, 2015—Available at: http://www.mophie.com/shop/iphone-5/juice-pack-helium-iphone-5, 7 pages.
"Qualcomm Quick Charge", Retrieved on: Aug. 13, 2015—Available at: https://www.qualcomm.com/products/snapdragon/quick-charge, 9 pages.
"Surface Power Cover", Retrieved on: Aug. 13, 2015—Available at: http://www.microsoft.com/surface/en-us/support/hardware-and-drivers/power-cover?os=windows-10, 8 pages.
"Understanding Lithium-ion-Battery University", Retrieved on: Sep. 23, 2015 Available at: http://batteryuniversity.com/learn/article/understanding_lithium_ion, 8 pages.
Albertus,"Experiments on and Modeling of Positive Electrodes with Multiple Active Materials for Lithium-Ion Batteries", In Journal of the Electrochemical Society, vol. 156, Issue 7, May 14, 2009, 1 page.
Balasubramanian,"Energy Consumption in Mobile Phones: A Measurement Study and Implications for Network Applications", Proceedings of the 9th ACM SIGCOMM conference on Internet measurement conference (IMC), Retrieved at «http://www.cs.umass.edu/-arunab/paper/tailender-imc09.pdf», Nov. 4, 2009, 14 Pages.
Benini,"Scheduling Battery Usage in Mobile Systems", In IEEE Transactions on Very Large Scale Integration Systems, vol. 11, Issue 6, Dec. 2003, pp. 1136-1143.
Bickford,"Security versus Energy Tradeoffs in Host-Based Mobile Malware Detection", In Proceedings of 9th International Conference on Mobile Systems, Applications, and Services, Jun. 28, 2011, pp. 225-238.
Borkar,"Intel Look Inside", Available at: http://www.intel.com/content/dam/www/public/us/en/documents/presentation/advancing-moores-law-in-2014-presentation.pdf, Aug. 11, 2014, 68 pages.
Carroll,"An Analysis of Power Consumption in a Smartphone", In Proceedings of USENIX Annual Technical Conference, Jun. 23, 2010, 14 pages.
Chiasserini,"Energy Efficient Battery Management", In IEEE Journal on Selected Areas in Communications, vol. 19, Issue 7, Jul. 2001, pp. 1235-1245.
Chikkannanavara,"A Review of Blended Cathode Materials for Use in Li-Ion Batteries", In Journal of Power Sources, vol. 248, Feb. 15, 2015, 2 Pages.
Clark,"New Tech Allows Lithium Batteries to Charge Faster, and Hold Charge Longer", Available at: http://www.gizmag.com/lithium-batteries-charge-faster-hold-longer/20550/, Oct. 20, 2015, 8 pages.
Cosby,"Multiple battery chemistries, single device!", Retrieved From: <https://e2e.ti.com/blogs_/b/fullycharged/archive/2015/06/16/multiple-battery-chemistries-single-device> Aug. 6, 2015, Jun. 16, 2015, 3 pages.
Erdinc,"A Dynamic Lithium-Ion Battery Model considering the Effects of Temperature and Capacity Fading", In Proceedings of International Conference on Clean Electrical Power, Jun. 9, 2009, pp. 383-386.
Flinn,"Managing Battery Lifetime with Energy-Aware Adaptation", In Journal of ACM Transactions on Computer Systems, vol. 22, Issue 2, May 2004, 43 pages.

(56) References Cited

OTHER PUBLICATIONS

Fonseca,"Quanto: Tracking Energy in Networked Embedded Systems", In Proceedings of 8th USENIX Conference on Operating Systems Design and Implementation, Dec. 8, 2008, 16 pages.
Gao,"Dynamic Lithium-Ion Battery Model for System Simulation", In Journal of IEEE Transactions on Components and Packaging Technologies, vol. 25, No. 3, Sep. 2002, pp. 495-505.
He,"State-of-Charge Estimation of the Lithium-Ion Battery Using an Adaptive Extended Kalman Filter Based on an Improved Thevenin Model", In Proceedings of IEEE Transactions on Vehicular Technology, vol. 60, Issue 4, May 2011, pp. 1461-1469.
Higgins,"Informed Mobile Prefetching", In Proceedings of the 10th international conference on Mobile systems, applications, and services, Jun. 25, 2012, pp. 155-168.
Jongerden,"Lifetime Improvement by Battery Scheduling", In Proceedings of the 16th international GI/ITG conference on Measurement, Modelling, and Evaluation of Computing Systems and Dependability and Fault Tolerance, Mar. 19, 2012, 15 pages.
Korhonen,"Predicting Mobile Device Battery Life", In Master's Thesis, Feb. 28, 2011, 62 pages.
Miettinen,"Energy Efficiency of Mobile Clients in Cloud Computing", In Proceedings of the 2nd USENIX conference on Hot topics in cloud computing, Jun. 22, 2010, 7 pages.
Miliche,"A First Experimental Investigation of the Practical Efficiency of Battery Scheduling", In Proceedings of 23th International Conference on Architecture of Computing Systems,, Feb. 22, 2010, 6 pages.
Mittal,"Empowering Developers to Estimate App Energy Consumption", In Proceedings of the 18th annual international conference on Mobile computing and networking, Aug. 22, 2012, pp. 317-328.
Pathak,"Fine-Grained Power Modeling for Smartphones using System Call Tracing", In Proceedings of the sixth conference on Computer systems, Apr. 10, 2011, pp. 153-168.
Pathak,"Where is the Energy Spent Inside My App? Fine Grained Energy Accounting on Smartphones with Eprof", In Proceedings of the 7th ACM European conference on Computer Systems, Apr. 10, 2012, pp. 29-42.
Qian,"Profiling Resource Usage for Mobile Applications: A Cross-layer Approach", In Proceedings of the 9th international conference on Mobile systems, applications, and services, Jun. 28, 2011, 14 pages.
Roy,"Energy Management in Mobile Devices with Cinder Operating System", In Proceedings of the sixth conference on Computer systems, Apr. 10, 2011, pp. 139-152.
Shanklin,"Samsung Gear Live vs. Gear 2", Available at: http://www.gizmag.com/samsung-gear-live-vs-gear-2-smartwatch-comparison/32775/, Jul. 1, 2014, 17 pages.
Shye,"Into the wild: Studying real user activity patterns to guide power optimizations for mobile architectures", In Proceedings of 42nd Annual IEEE/ACM International Symposium on Microarchitecture,, Dec. 12, 2009, pp. 168-178.
Srinivasan,"This week in batteries (TWiB)", Available at: http://thisweekinbatteries.blogspot.in/2010_06_01_archive.html, Jun. 28, 2015, 4 pages.
Styler,"Active Management of a Heterogeneous Energy Store for Electric Vehicles", Retrieved from: <http://repository.cmu.edu/cgi/viewcontent.cgi?article=1845&context=robotics> on Jun. 29, 2011, 8 Pages.
Thiagarajan,"Who Killed My Battery: Analyzing Mobile Browser Energy Consumption", In Proceedings of the 21st international conference on World Wide Web, Apr. 16, 2012, pp. 41-50.
Viswanathan,"Effect of Entropy Change of Lithium Intercalation on Cathodes and Anodes on Li-ion Battery Thermal Management", In Journal of Power Sources, vol. 195, Issue 11, Jun. 1, 2010, pp. 3720-3729.
Xu,"Optimizing Background Email Sync on Smartphones", In Proceeding of the 11th Annual International Conference on Mobile Systems, Applications, and Services, Jun. 25, 2013, pp. 55-68.
Yoon,"App-Scope: Application Energy Metering Framework for Android Smartphones using Kernel Activity Monitoring", In Proceedings of the USENIX conference on Annual Technical Conference, Jun. 15, 2012, 14 pages.
Zhang,"Accurate Online Power Estimation and Automatic Battery Behavior Based Power Model Generation for Smartphones", In Proceedings of the eighth IEEE/ACM/IFIP international conference on Hardware/software codesign and system synthesis, Oct. 24, 2010,, Oct. 24, 2010, pp. 105-114.
"Boltzmann Machines and Deep Belief Networks", Retrieved from <http://plearn.berlios.de/machine_learning/node4.html> on Jun. 22, 2009, 7 pages.
"Final Office Action", U.S. Appl. No. 12/503,605, dated Sep. 20, 2012, 12 pages.
"Non-Final Office Action Response", U.S. Appl. No. 12/503,605, dated Jan. 12, 2012, 11 pages.
"Non-Final Office Action Response", U.S. Appl. No. 12/503,605, dated Oct. 4, 2013, 14 pages.
"Non-Final Office Action Response", U.S. Appl. No. 13/530,130, dated Oct. 3, 2014, 8 pages.
"Notice of Allowance", U.S. Appl. No. 12/503,605, dated Jul. 23, 2014, 5 pages.
"On-the-Go and Embedded Host Supplement to the USB Revision 2.0 Specification", Retrieved from <<http://www.usb.org/developers/onthego/USB_OTG_and_EH_2-0.pdf>> on Sep. 21, 2009, May 8, 2009, 79 pages.
"The PASCAL Visual Object Classes Challenges 2008 (VOC2008) Results", Retrieved from <<http://pascallin.ecs.soton.ac.uk/challengesNOC/voc2008/results/index.shtml>> on Jun. 19, 2009, Jun. 22, 2009, 5 pages.
Ackley, et al., "A Learning Algorithm for Boltzmann Machines", Cognitive Science 9, pp. 147-169, 1985, 23 pages.
Freund, et al., "Unsupervised Learning of Distributions on Binary Vectors Using Two Layer Networks", Baskin Center for Computer Engineering & Information Sciences, University of California, Santa Cruz, UCSC-CRL-94-25, Jun. 22, 1994, 41 pages.
Hinton, et al., "A Fast Learning Algorithm for Deep Belief Nets", Retrieved from <<http://www.cs.toronto.edu/-hinton/absps/fastnc.pdf>> on Jun. 19, 2009, 2006, 16 pages.
Kohli, et al., "Robust Higher Order Potentials for Enforcing Label Consistency", Retrieved from <<http://research.microsoft.com/en-us/um/people/pkohli/papers/klt_cvpr08.pdf>> on Jun. 19, 2009, 8 pages.
Kumar, et al., "Discriminative Random Fields", International Journal of Computer Vision 68(2), 179-201, 2006, 23 pages.
Larochelle, et al., "An Empirical Evaluation of Deep Architectures on Problems with Many Factors of Variation", University of Montreal, CIAR Summer School, Aug. 9, 2007, 24 pages.
Lee, et al., "Sparse Deep Belief Net Model for Visual Area V2", Computer Science Department, Stanford University, Retrieved from <<http://books.nips.cc/papers/files/nips20/NIPS2007 0934.pdf>> on Jun. 19, 2009, 8 pages.
Lu, et al., "A Scalable and Programmable Architecture for the Continuous Restricted Boltzmann Machine in VLSI", The Department of Electrical Engineering, The National Tsing-Hua University, Taiwan, IEEE, 2007, pp. 1297-1300, 2007, 4 pages.
Osindero, et al., "Modeling Image Patches with a Directed Hierarchy of Markov Random Fields", Retrieved from <<http://www.cs.toronto.edu/-hinton/absps/lateral.pdf>> on Jun. 19, 2009, 8 pages.
Ranzato, et al., "Space Feature Learning for Deep Belief Networks", Retrieved from <<http://yann.lecun.com/exdb/publis/pdf/ranzato-nips-07 .pdf>> on Jun. 19, 2009, 8 pages.
Ravi, et al., "Context-aware Battery Management for Mobile Phones", Proceedings of the Sixth Annual IEEE International Conference on Pervasive Computing and Communications (PERCOM), Retrieved at <http://www.cs.rutgers.edu/discolab/smartphone/papers/percom08.pdf>,2008, 10 Pages.
Ross, et al., "A Systematic Approach to Learning Object Segmentation from Motion", MIT Computer Science and AI Laboratory, Retrieved from <<http://web.mit.edu/mgross/www/publications/mgrlpk-cvw-paper-03.pdf>> on Jun. 19, 2009, 8 pages.

(56) References Cited

OTHER PUBLICATIONS

Roth, et al., "Fields of Experts: A Framework for Learning Image Priors", IEEE, Retrieved from <<http://ieeexplore.ieee.org/stamp/stamp.jsp?tp=&isnumber=31473&arnumber=1467533>> on Jun. 19, 2009, 8 pages.

Shotton, et al., "Semantic Texton Forests for Image Categorization and Segmentation", IEEE, Retrieved from <<http://ieeexplore.ieee.org/stamp/stamp.jsp?tp=&arnumber=4587503&isnumber=4587335>> on Jun. 19, 2009, 2008, 8 pages.

Shotton, et al., "TextonBoost for Image Understanding: Multi-Class Object Recognition and Segmentation by Jointly Modeling Texture, Layout, and Context", Retrieved from <<http://johnwinn.org/Publications/papers/TextonBoost_IJCV2009.pdf>>on Jun. 19, 2009, Jul. 2, 2007, 30 pages.

Smolensky, "Information Processing in Dynamical Systems: Foundations of Harmony Theory", CU-CS-321-86, University of Colorado at Boulder, Department of Computer Science, Retrieved from, Feb. 1986, 55 pages.

Tieleman, "Training Restricted Boltzmann Machines Using Approximations to the Likelihood Gradient", Proceedings of the 25th International Conference on Machine Learning, pp. 1064-1071, 2008, 8 pages.

Tu, et al., "Image Parsing: Unifying Segmentation, Detection, and Recognition", Proceedings of the Ninth IEEE International Conference on Computer Vision (ICCV 2003) 2-Volume Set, 2003, 8 pages.

Tu, et al., "Image Segmentation by Data-Driven Markov Chain Monte Carlo", IEEE Transactions on Pattern Analysis and Machine Intelligence, vol. 24, No. 5, pp. 657-673, May 2002, 17 pages.

Zheng, et al., "Enhancing Battery Efficiency for Pervasive Health-Monitoring Systems Based on Electronic Textiles", In Proceedings of IEEE Transactions on Information Technology in Biomedicine, vol. 14, No. 2, Nov. 3, 2009, 10 pages.

Zhu, et al., "A Stochastic Grammar of Images", Foundations and Trends in Computer Graphics and Vision, vol. 2, No. 4, pp. 259-362, 2006, 104 pages.

"Final Office Action", U.S. Appl. No. 14/943,967, dated Oct. 19, 2017, 10 pages.

"Final Office Action", U.S. Appl. No. 14/626,600, dated Nov. 16, 2017, 31 pages.

"Second Written Opinion", Application No. PCT/US2016/055238, dated Sep. 27, 2017, 6 pages.

"Second Written Opinion", Application No. PCT/US2016/063741, dated Sep. 29, 2017, 6 pages.

"Notice of Allowance", U.S. Appl. No. 14/941,416, dated Nov. 27, 2017, 7 pages.

"International Search Report and Written Opinion", Application No. PCT/US2016/016670, dated Sep. 14, 2016, 23 pages.

"International Search Report and Written Opinion", Application No. PCT/US2016/016669, dated Sep. 30, 2016, 24 pages.

"Non-Final Office Action", U.S. Appl. No. 14/617,719, dated Aug. 22, 2016, 9 pages.

"Non-Final Office Action", U.S. Appl. No. 14/617,751, dated Aug. 25, 2016, 10 pages.

"Non-Final Office Action", U.S. Appl. No. 14/885,858, dated Oct. 7, 2016, 18 pages.

"Second Written Opinion", Application No. PCT/US2016/015493, dated Jul. 28, 2016, 5 pages.

"Second Written Opinion", Application No. PCT/US2016/016037, dated Sep. 1, 2016, 5 pages.

"Final Office Action", U.S. Appl. No. 13/530,130, dated Apr. 22, 2015, 7 pages.

"Non-Final Office Action", U.S. Appl. No. 12/503,605, dated Jan. 12, 2012, 11 pages.

"Non-Final Office Action", U.S. Appl. No. 12/503,605, dated Oct. 4, 2013, 14 pages.

"Non-Final Office Action", U.S. Appl. No. 13/530,130, dated Oct. 3, 2014, 8 pages.

"Final Office Action", U.S. Appl. No. 14/617,751, dated Mar. 10, 2017, 11 pages.

"Second Written Opinion", Application No. PCT/US2015/026052, dated Mar. 29, 2016, 6 pages.

"Corrected Notice of Allowance", U.S. Appl. No. 14/617,719, dated May 30, 2017, 2 pages.

"Corrected Notice of Allowance", U.S. Appl. No. 14/617,719, dated Jun. 8, 2017, 2 pages.

"Corrected Notice of Allowance", U.S. Appl. No. 14/633,009, dated Jul. 28, 2017, 2 pages.

"Corrected Notice of Allowance", U.S. Appl. No. 14/633,009, dated Jun. 7, 2017, 4 pages.

"Final Office Action", U.S. Appl. No. 14/885,858, dated Jun. 9, 2017, 22 pages.

"International Preliminary Report on Patentability", Application No. PCT/US2016/015493, dated Apr. 21, 2017, 6 pages.

"International Preliminary Report on Patentability", Application No. PCT/US2016/016669, dated Mar. 10, 2017, 7 pages.

"International Preliminary Report on Patentability", Application No. PCT/US2016/016670, dated May 12, 2017, 7 pages.

"International Preliminary Report on Patentability", Application No. PCT/US2016/016034, dated Aug. 4, 2017, 9 pages.

"Non-Final Office Action", U.S. Appl. No. 14/617,751, dated Jun. 30, 2017, 11 pages.

"Non-Final Office Action", U.S. Appl. No. 14/662,938, dated Aug. 9, 2017, 33 pages.

"Non-Final Office Action", U.S. Appl. No. 14/941,416, dated May 17, 2017, 13 pages.

"Non-Final Office Action", U.S. Appl. No. 14/959,265, dated Apr. 21, 2017, 8 pages.

"Notice of Allowance", U.S. Appl. No. 14/262,205, dated May 31, 2017, 5 pages.

"Notice of Allowance", U.S. Appl. No. 14/959,265, dated Jun. 29, 2017, 5 pages.

"Corrected Notice of Allowance", U.S. Appl. No. 14/941,416, dated Mar. 8, 2018, 2 pages.

"Corrected Notice of Allowance", U.S. Appl. No. 14/941,416, dated Dec. 26, 2017, 2 pages.

"Final Office Action", U.S. Appl. No. 14/617,751, dated Feb. 5, 2018, 11 pages.

"Final Office Action", U.S. Appl. No. 14/617,751, dated Feb. 13, 2018, 14 pages.

"Final Office Action", U.S. Appl. No. 14/617,751, dated Mar. 7, 2018, 12 pages.

"Final Office Action", U.S. Appl. No. 14/626,518, dated Jan. 11, 2018, 37 pages.

"Final Office Action", U.S. Appl. No. 14/662,938, dated Feb. 21, 2018, 44 pages.

"Advanced Configuration and Power Interface", Retrieved from <http://www.acpi.info/> on Nov. 3, 2014, Jul. 23, 2014, 2 pages.

"Anode active material for Lithium-ion-battery-Gramax", Retrieved from <http://www.ogc.co.jp/e/products/battery/> on Nov. 3, 2014, 2014, 2 pages.

"Anode Materials", Retrieved from <http://www.targray.com/li-ion-battery/anode-materials> on Nov. 3, 2014, Nov. 1, 2010, 2 pages.

"Cell Trak", Retrieved from <http://celltraksystems.com/monitoring_parameters.html> on Nov. 4, 2014, Aug. 16, 2013, 4 pages.

"Ford Developers Look to Use Google Prediction API to Optimize Energy Efficiency", Retrieved from <http://corporate.ford.com/news-center/press-releases-detail/pr-ford-developers-look-to-use-google-34591> on Nov. 11, 2014, May 10, 2011, 1 page.

"Skoda Navigation", Retrieved from <https://skoda.garmin.com/skoda/site/productOverview> on Oct. 27, 2014, Jan. 23, 2014, 1 page.

Allen,"Microfabricated Fast-Charging Energy Storage Devices", Retrieved from <http://yprize.upenn.edu/technology/fast-charging-batteries> on Nov. 3, 2014, 2014, 2 pages.

Balan,"The Case for Cyber Foraging", In Proceedings of the 10th workshop on ACM SIGOPS European Workshop, Jul. 2002, 6 pages.

Banerjee,"Users and Batteries: Interactions and Adaptive Energy Management in Mobile Systems", In Proceedings of the 9th International Conference on Ubiquitous Computing, Sep. 2007, 18 pages.

(56) References Cited

OTHER PUBLICATIONS

Bashash,"Battery Health-conscious Plug-in Hybrid Electric Vehicle Grid Demand Prediction", In Proceedings of the ASME Dynamic Systems and Control Conference, Sep. 13, 2010, 9 pages.

Benini,"Battery-Driven Dynamic Power Management of Portable Systems", In Proceedings 13th International Symposium on System Synthesis, Sep. 20, 2000, 6 pages.

Benini,"Discharge Current Steering for Battery Lifetime Optimization", In Proceedings of the International Symposium on Low Power Electronics and Design, Aug. 12, 2002, pp. 118-123.

Benini,"Extending Lifetime of Portable Systems by Battery Scheduling", In Proceedings of the conference on Design, automation and test in Europe, Mar. 13, 2001, 5 pages.

Chan,"A New Battery Model for use with Battery Energy Storage Systems and Electric Vehicles Power Systems", In IEEE Power Engineering Society Winter Meeting, vol. 1, Jan. 23, 2000, 6 pages.

Chang,"The State of Charge Estimating Methods for Battery: A Review", In Proceeding of the ISRN Applied Mathematics, May 12, 2013, 8 pages.

Chen,"An Accurate Electrical Battery Model Capable of Predicting Runtime and I-V Performance", In Proceeding of the IEEE Transactions on Energy Conversion, vol. 21, Issue 2, Jun. 5, 2006, 8 pages.

Chiasson,"Estimating the State of Charge of a Battery", In Proceedings of IEEE Transactions on Control Systems Technology, vol. 13, Issue 3, Apr. 25, 2005, 6 pages.

Clark,"These solar-Powered Benches Charge Phones for Free", Retrieved from <http://www.wired.co.uk/news/archive/2014-07/09/soofa> on Nov. 3, 2014, Jul. 9, 2014, 4 pages.

Dong,"Self-Constructive High-Rate System Energy Modeling for Battery-Powered Mobile Systems", In Proceedings of the 9th international conference on Mobile systems, applications, and services, Jun. 28, 2011, 14 pages.

Fairley,"Software Looks at the Road Ahead to Boost Hybrid-Car Efficiency", Retrieved from <http://spectrum.ieee.org/transportation/systems/software-looks-at-the-road-ahead-to-boost-hybridcar-efficiency> on Nov. 11, 2014, Feb. 3, 2009, 1 page.

Flinn,"Energy-Aware Adaptation for Mobile Applications", In Proceedings of the Seventeenth ACM Symposium on Operating Systems Principles, Dec. 1999, pp. 48-63.

Fox,"Automatic Construction of Efficient Multiple Battery Usage Policies", In Proceedings of the Twenty-Second International Joint Conference on Artificial Intelligence, Jun. 11, 2011, 6 pages.

Gonder,"Route-Based Control of Hybrid Electric Vehicles", In SAE Technical Paper, Apr. 14, 2008, 11 pages.

Gong,"Trip Based Optimal Power Management of Plug-in Hybrid Electric Vehicle with Advanced Traffic Modeling", In SAE International Journal of Engines, Apr. 14, 2008, 1 page.

Gong,"Trip Based Optimal Power Management of Plug-in Hybrid Electric Vehicles Using Gas-Kinetic Traffic Flow Model", In Proceedings of American Control Conference, Jun. 11, 2008, 6 pages.

Groiß,"The Influence of Temperature on the Operation of Batteries and Other Electrochemical Energy Storage Systems", Retrieved from <http://www.basytec.de/Literatur/temperature/DE_2002.htm> on Nov. 3, 2014, Jan. 8, 2003, 7 pages.

Gu,"Thermal-Electrochemical Modeling of Battery Systems", In Journal of Electrochemical Society, Jan. 28, 2000, 41 pages.

Hayakawa,"Incentive Based Multi-Objective Optimization in Electric Vehicle Navigation including Battery Charging", In Proceedings of the International Federation of Automatic Control, Aug. 24, 2014, 7 pages.

He,"Vehicle-Infrastructure Integration-Enabled Plug-in Hybrid Electric Vehicles for Optimizing Energy Consumption", In Transportation Research Board 90th Annual Meeting Compendium of Papers DVD, Jan. 23, 2011, 14 pages.

Heath,"Code Transformations for Energy Efficient Device Management", In Journal of IEEE Transactions on Computers, vol. 53, Issue 8, Aug. 2004, 37 pages.

Johnson,"Temperature Dependent Battery Models for High-Power Lithium-Ion Batteries", In 17th Annual Electric Vehicle Symposium, Oct. 15, 2000, 17 pages.

Jongerden,"Maximizing System Lifetime by Battery Scheduling", In Proceeding of the IEEE/IFIP International Conference on Dependable Systems & Networks, Jun. 29, 2009, 10 pages.

Katsargyri,"Optimally Controlling Hybrid Electric Vehicles using Path Forecasting", In Proceedings of American Control Conference, Jun. 10, 2009, 6 pages.

Keshav,"Energy efficient scheduling in 4G smart phones for Mobile Hotspot Application", In Proceedings: National Conference on Communications, Feb. 3, 2012, 5 Pages.

Koushanfar,"Hybrid Heterogeneous Energy Supply Networks", In IEEE International Symposium on Circuits and Systems, May 15, 2011, 4 pages.

Krumm,"Predestination: Inferring Destinations from Partial Trajectories", UbiComp 2006: The Eighth International Conference on Ubiquitous Computing, Sep. 17-21, 2006, Orange County, CA, retrieved from <http://research.microsoft.com/en-us/um/people/horvitzlpredestination.pdf> on Feb. 5, 2009, Sep. 17, 2006, 18 pages.

Krumm,"Predestination: Where Do You Want to Go Today?", In Journal of Computer, vol. 40, Issue 4, Apr. 2007, 4 pages.

Krumm,"Where Will They Turn: Predicting Turn Proportions at Intersections", In Journal of Personal and Ubiquitous Computing, vol. 14, Issue 7, Oct. 2010, 14 pages.

Laasonen,"Adaptive On-Device Location Recognition", In Proceedings of the 2nd International Conference on Pervasive Computing, Researchers and Practitioners, Apr. 2004, pp. 287-304.

LaMarca,"Place Lab: Device Positioning Using Radio Beacons in the Wild", In Proceedings of Pervasive 2005, Munich, Germany, retrieved from <http://www.placelab.org/publications/pubs/pervasive-placelab-2005-final.pdf> on Feb. 5, 2009, May 2005, 18 pages.

Langari,"Intelligent Energy Management Agent for a Parallel Hybrid Vehicle—Part I: System Architecture and Design of the Driving Situation Identification Process", In IEEE Transactions on Vehicular Technology, vol. 54, Issue 3, May 23, 2005, 10 pages.

Mak,"Infrastructure Planning for Electric Vehicles with Battery Swapping", In Journal of Academic Science, vol. 59, Issue 7, Jul. 2013, 33 pages.

Man,"Towards a Hybrid Approach to SoC Estimation for a Smart Battery Management System (BMS) and Battery Supported Cyber-Physical Systems (CPS)", In Proceeding of the 2nd Baltic Congress on Future Internet Communications, Apr. 25, 2012, 4 pages.

Mandal,"IntellBatt: Towards Smarter Battery Design", In Proceedings of 45th ACM/IEEE Design Automation Conference, Jun. 8, 2008, 6 pages.

MIT"Reality Commons", Retrieved from <http://realitycommons.media.mit.edu/> on Nov. 3, 2014, 2014, 2 pages.

Musardo,"A-ECMS: An Adaptive Algorithm for Hybrid Electric Vehicle Energy Management", In Proceedings of the 44th IEEE Conference on Decision and Control, and the European Control Conference, Dec. 12, 2005, 8 pages.

Panigrahi,"Battery Life Estimation of Mobile Embedded Systems", In Proceeding of the Fourteenth International Conference on VLSI Design, Jan. 2001, 7 pages.

Prigg,"Charged in 30 seconds: Israeli Firm Claims Battery Breakthrough that could Change the way we Power Phones and Laptops", Retrieved from <http://www.dailymail.co.uk/sciencetech/article-2599243/Charged-30-seconds-Israeli-firm-claims-battery-breakthrough-change-way-charge-phones-laptops.html> on Nov. 3, 2014, Apr. 7, 2014, 6 pages.

Rao,"Analysis of Discharge Techniques for Multiple Battery Systems", In Proceedings of the International Symposium on Low Power Electronics and Design, Aug. 25, 2003, pp. 44-47.

Rao,"Battery Modeling for Energy-Aware System Design", In Journal of Computer, vol. 36, Issue 12, Dec. 2012, 11 pages.

Ravi,"Context-aware Battery Management for Mobile Phones: A Feasibility Study", In Proceedings of IEEE International Conference on Pervasive Computing and Communications, 2006, 16 pages.

Richard,"Google's Prediction API Could Optimize Your Car's Fuel Efficiency", Retrieved from <http://www.treehugger.com/cars/googles-

(56) References Cited

OTHER PUBLICATIONS prediction-api-could-optimize-your-cars-fuel-efficiency.html> on Nov. 11, 2014, May 18, 2011, 3 pages.

Rong, "An Analytical Model for Predicting the Remaining Battery Capacity Prediction for Lithium-Ion Batteries", In Proceedings of the conference on Design, Automation and Test in Europe—vol. 1, Mar. 2003, 2 pages.

Sachenbacher, "Modeling and Optimization for Efficient Electrical Mobility: Challenges from the E-Tour Project", In Proceedings of First International Workshop on Constraint Reasoning and Optimization for Computational Sustainability, Sep. 20, 2009, 2 pages.

Sathiyanarayanan, "Maximization Battery Lifetime and Improving Efficiency", In Proceedings of International Conference on Devices, Circuits and Systems, Mar. 15, 2012, 4 pages.

Simpson, "Characteristics of Rechargeable Batteries", In Literature No. SNVA533, 2011, 12 pages.

Strommer, "NFC-enabled Wireless Charging", In Proceedings of the 4th International Workshop on Near Field Communication, Mar. 13, 2012, 6 pages.

Styler, "Active Management of a Heterogeneous Energy Store for Electric Vehicles", In IEEE Forum on Integrated and Sustainable Transportation System, Jun. 29, 2011, 6 pages.

Wagner, "Microsoft Planning 7-Day Phone Batteries", Retrieved from <http://www.lightreading.com/mobile/devices-smartphones/microsoft-planning-7-day-phone-batteries/d/d-id/709382> on Nov. 11, 2014, Jun. 10, 2014, 4 pages.

Wang, "Reducing Power Consumption for Mobile Platforms via Adaptive Traffic Coalescing", In IEEE Journal on Selected Areas in Communications, vol. 29, Issue 8, Sep. 2011, pp. 1618-1629.

Wen, "Online prediction of Battery Lifetime for Embedded and Mobile Devices", In Proceedings of the Third International Conference on Power—Aware Computer Systems, Dec. 1, 2003, 15 pages.

Wu, "An Interleaved Dual-Battery Power Supply for Battery-Operated Electronics", In Proceedings of the Asia and South Pacific Design Automation Conference, Jan. 28, 2001, pp. 387-390.

Xu, "V-edge: Fast Self-constructive Power Modeling of Smartphones Based on Battery Voltage Dynamics", In Proceedings of the 10th USENIX conference on Networked Systems Design and Implementation, Apr. 2, 2013, 24 pages.

Zeng, "ECOSystem: Managing Energy as a First Class Operating System Resource", In Proceedings of ASPLOS 2002, Available at <http://www.cs.duke.edu/~vahdat/ps/ecosystem.pdf>, Oct. 2002, 10 pages.

Zhang, "Abstract—Cooperation Behavior between Heterogeneous Cations in Hybrid Batteries", In Journal of Chemical Communications, Issue 85, Aug. 22, 2013, 4 pages.

Zhang, "Modeling Discharge Behavior of Multicell Battery", In Proceeding of the IEEE Transactions on Energy Conversion, vol. 25, Issue 4, Dec. 2010, pp. 1133-1141.

"International Preliminary Report on Patentability", Application No. PCT/US2016/016671, dated Feb. 22, 2017, 6 pages.

"International Search Report and Written Opinion", Application No. PCT/US2016/063741, dated Mar. 22, 2017, 13 pages.

"International Search Report and Written Opinion", Application No. PCT/US2016/060415, dated Feb. 22, 2017, 16 pages.

"Non-Final Office Action", U.S. Appl. No. 14/626,518, dated Mar. 27, 2017, 24 pages.

"Notice of Allowance", U.S. Appl. No. 14/617,719, dated Mar. 1, 2017, 5 pages.

"Notice of Allowance", U.S. Appl. No. 14/633,009, dated Apr. 18, 2017, 7 pages.

"Altium Designer", Retrieved from https://web.archive.org/web/20060618084652/http://www.altium.com:80/Evaluate/DemoCenter/, Jun. 18, 2006, 1 Page.

"Apple MacBook (2015) Battery Design", Retrieved from https://web.archive.org/web/20171218064916/http://www.apple.com/macbook/, Dec. 18, 2017, 3 Pages.

"Cortana Personal Assistant", Retrieved from https://web.archive.org/web/20170716090918/https://support.microsoft.com/en-us/help/11694/windows-phone-cortana-on-your-windows-phone, Jul. 28, 2017, 1 Page.

"Electric Vehicle Extended Range Hybrid Battery Pack System", Retrieved from http://www.freshpatents.com/-dt20130718ptan20130181511.php, Mar. 27, 2014, 4 Pages.

"External Battery Packs", Retrieved from https://web.archive.org/web/20130104202022/http://www.ianker.com/External%20Batteries/category-c1-s1, Jan. 4, 2013, 1 Page.

"Intel Active CPU Power Levels", Retrieved from https://web.archive.org/web/20150711224924/http://www.intel.com/content/dam/www/public/us/en/documents/presentation/advancing-moores-law-in-2014-presentation.pdf, Jul. 11, 2015, 68 Pages.

"iPhone Battery Case", Retrieved from https://web.archive.org/web/20130901025853/http://www.mophie.com/shop/iphone-5/juice-pack-helium-iphone-5/, Sep. 1, 2013, 8 Pages.

"Maxim Fuel Gague for Mobile Devices", Retrieved from https://web.archive.org/web/20140713153231/http://para.maximintegrated.com/en/results.mvp?fam=batt_stat&295=Fuel%26nbsp%3BGauge&1379=ModelGauge, Jul. 13, 2014, 2 Pages.

"Samsung Galaxy Gear Specs", Retrieved from https://web.archive.org/web/20131115110653/http://www.samsung.com/us/mobile/wearable-tech/SM-V7000ZKAXAR, Nov. 15, 2013, 4 Pages.

"Siri Personal Assistant", Retrieved from https://www.apple.com/ios/siri/, Retrieved on: Jun. 7, 2018, 4 Pages.

"Texas Instruments Fuel Guages for Mobile Devices", Retrieved from http://www.ti.com/power-management/battery-management/fuel-gauge/products.html#p1152=Single%20Cell&p338=Li-Ion/Li-Polymer&p199=I2C&o4=Active&p626max=2000;29000&p626min=100;100&p1960=&p2192=&p2954=DSBGA, Retrieved on: Jun. 7, 2018, 2 Pages.

"Non-final Office Action Issued in U.S Appl. No. 14/626,518", dated Apr. 19, 2018, 41 Pages.

"Non-Final Office Action Issued in U.S. Appl. No. 15/613,372", dated Jul. 25, 2018, 16 Pages.

"Office Action Issued in European Patent Application No. 15719556.1", dated Sep. 14, 2017, 4 Pages.

"Office Action Issued in European Patent Application No. 16704985.7", dated Jun. 18, 2018, 5 Pages.

"Office Action Issued in European Patent Application No. 16705392.5", dated Jul. 11, 2018, 5 Pages.

Badam, et al., "Software Defined Batteries", In the Proceedings of 25th Symposium on Operating Systems Principles, Oct. 4, 2015, pp. 215-229.

Govindan, et al., "Benefits and Limitations of Tapping into Stored Energy for Datacenters", In Proceedings of the 38th Annual International Symposium on Computer Architecture, Jun. 4, 2011, 11 Pages.

Hayakawa, et al., "Incentive Based Multi-Objective Optimization in Electric Vehicle Navigation including Battery Charging", In Proceedings of the International Federation of Automatic Control, vol. 47, Issue 3, Aug. 24, 2014, pp. 6332-6337.

Hermann, Arthur Weston, "Thermal Energy Transfer System for a Power Source Utilizing Both Metal-Air and Non-Metal-Air Battery Packs", Retrieved from https://web.archive.org/web/20171006075450/http://www.freshpatents.com:80/-dt20120216ptan20120040210.php, Oct. 6, 2017, 4 Pages.

"International Preliminary Report on Patentability Issued in PCT Application No. PCT/US2016/063741", dated Mar. 22, 2017, 13 Pages.

Wang, et al., "A Framework for Energy Efficient Mobile Sensing for Automatic Human State Recognition", In Proceedings of the 7th International Conference on Mobile Systems, Applications, and Services, Jun. 22, 2009, pp. 179-192.

Wang, et al., "Energy storage in Datacenters: What, Where, and How much?", In Proceedings of the 12th ACM Sigmetrics/Performance joint international conference on Measurement and Modeling of Computer Systems, vol. 40, Issue 1, Jun. 11, 2012, pp. 187-198.

"Final Office Action Issued in U.S. Appl. No. 14/626,518", dated Sep. 7, 2018, 33 Pages.

(56) References Cited

OTHER PUBLICATIONS

"Non Final Office Action Issued in U.S. Appl. No. 14/885,858", dated Sep. 10, 2018, 23 Pages.
"Notice of Allowance Issued in U.S. Appl. No. 15/650,666", dated Sep. 11, 2018, 9 Pages.
"Office Action Issued in European Patent Application No. 16705002.0", dated Aug. 15, 2018, 5 Pages.
"Notice of Allowance Issued in Europe Patent Application No. 16706075.5", dated Jul. 25, 2018, 5 Pages.

* cited by examiner

DYNAMICALLY CHANGING INTERNAL STATE OF A BATTERY

BACKGROUND

Many devices today utilize some form of battery for various power needs, such as a primary power source, a backup power source, and so forth. Battery life is a primary concern, particularly with mobile devices such as mobile phones, portable computing devices, wearables, and so forth. Current battery designs typically provide little if any flexibility in affecting battery performance during various usage scenarios.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for dynamically changing internal state of a battery are described herein. Generally, different battery configurations are described that enable transitions between different battery power states, such as to accommodate different battery charge and/or discharge scenarios.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
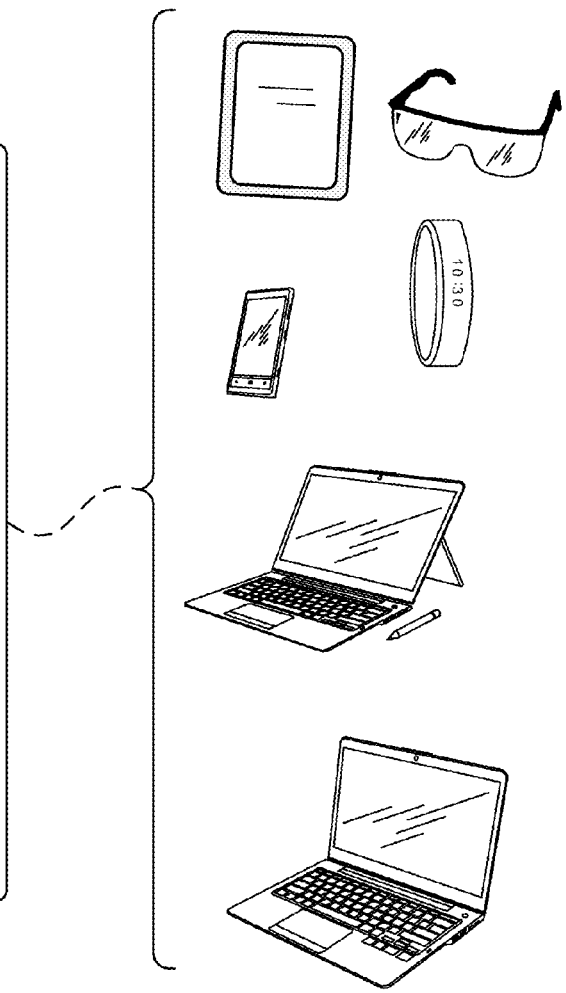
FIG. 1 is an illustration of an environment in an example implementation that is operable to employ techniques discussed herein in accordance with one or more embodiments.

Techniques for dynamically changing internal state of a battery are described herein. Generally, different battery configurations are described that enable transitions between different battery power states, such as to accommodate different battery charge and/or discharge scenarios.

For instance, one or more implementations utilize temperature to control power state of a battery. Consider, for example, a scenario where a mobile device detects that additional battery life is required, such as to keep the device powered on, to provide power for a high-priority application, and so forth. In response, heat is applied to a battery of the mobile device to cause an electrolyte within the battery to swell. Generally, swelling of the electrolyte increases the ability of the battery to discharge its available stored charge, e.g., increases its discharge capacity. For instance, swelling of the electrolyte increases the ion porosity of the internal components of the battery such that increased ion exchange is promoted.

In another example scenario, a fast battery charge may be desired. For instance, a user may be at an airport and may wish to quick charge their mobile device prior to boarding a plane. Accordingly, the user plugs their device into a power source (e.g., a mains alternating current (AC) outlet or a charging station) to begin battery charging. As part of the quick charge implementation, heat is applied to an electrolyte of the battery to cause electrolyte swelling and thus increase porosity of internal components of the battery. This increase in porosity increases the rate at which electrical charge is retained by the battery, e.g., compared with a non-heated implementation.

In alternative or additional implementations, a mixed electrode battery configuration is utilized that includes activatable materials that are activatable in response to various stimuli to accommodate different power scenarios. For instance, an example battery includes a primary electrode material that provides power during standard operating scenarios, and a dynamic electrode material that is generally inactive during standard operating scenarios. When a power event occurs that indicates an increased power requirement (e.g., additional battery life), the dynamic electrode material is activated to increase ion and/or electrical conductivity across the dynamic electrode material. Generally, activation of the dynamic electrode material increases discharge capacity and/or practical charge rate of the battery. Various stimuli may be utilized to activate the dynamic electrode material, such as applied heat, catalytic activation, mechanical activation (e.g., battery vibration), high frequency radio frequency (RF) waves, and so forth. Further details and implementations are described below.

In the following discussion, an example environment is first described that is operable to employ techniques described herein. Next, a section entitled "Example Dynamic Batteries" describes some example batteries in accordance with one or more implementations. Following this, a section entitled "Example Implementation Scenarios" describes some example scenarios for dynamically changing internal state of a battery in accordance with one or more embodiments. Next, a section entitled "Example Procedure" describes an example procedure for dynamically changing internal state of a battery in accordance with one or more embodiments. Finally, a section entitled "Example System and Device" describes an example system and device that are operable to employ techniques discussed herein in accordance with one or more embodiments.

Example Environment

FIG. 1 illustrates an example environment 100 for performing techniques for dynamically changing internal state of a battery. Environment 100 includes a computing device 102, which may be implemented in various ways. The computing device 102, for instance, may be configured as a traditional computer (e.g., a desktop personal computer, laptop computer, and so on), a mobile station, an entertainment appliance, a wireless phone, a tablet, a netbook, a wearable device, and so forth as further described in relation to FIG. 8.

Thus, the computing device 102 may range from a full resource device with substantial memory and processor resources (e.g., personal computers, game consoles) to a low-resource device with limited memory and/or processing resources, such as a traditional set-top box, hand-held game console, wearable device, smart appliance (e.g., "Internet of Things" (IoT) device), health monitoring and assistance device, personal navigation device, and so forth. The computing device 102 also relates to software that causes the computing device 102 to perform various operations. Further, while implementations are discussed herein with reference to a computing device, it is to be appreciated that techniques discussed herein may be utilized in any apparatus that utilizes batteries, such as a medical device, a vehicle (e.g., an electronic vehicle), a robotic machine, a toy, and so forth. The computer device 102, for instance, may represent an internal controller of an apparatus.

Computing device 102 includes computer processor(s) 104 and computer-readable storage media 106 (media 106). Media 106 includes an operating system 108, applications 110, and a power manager module (hereinafter "power manager") 112.

Computing device 102 also includes power circuitry 114 and a dynamic battery 116. According to various implementations, the dynamic battery 116 represents one or more battery cells from which the computing device 102 draws power to operate, and which are rechargeable to replenish power within the dynamic battery 116. Generally, power circuitry 114 represents functionality to enable the computing device 102 to draw operating power from the dynamic battery 116 or to apply charging power to the dynamic battery 116. Although a single dynamic battery 116 is illustrated, it is to be appreciated that the dynamic battery 116 may include any suitable number or type of battery cells and may be implemented according to a variety of different types and form factors of batteries Implementations and uses of the power circuitry 114 and the dynamic battery 116 vary and are described in greater detail below.

The power manager 112 is representative of functionality to enable various operational parameters of the dynamic battery 116 to be controlled. For instance, the power manager 112 may interface with the power circuitry 114 and/or directly with the dynamic battery 116 to configure and reconfigure operational parameters, operational state, and/or physical state of the dynamic battery 116.

Computing device 102 also includes one or more displays 118 and input mechanisms 120. The displays 118 are generally representative of hardware and logic for visual output. The input mechanisms 120 may include gesture-sensitive sensors and devices, such as touch-based sensors and movement-tracking sensors (e.g., camera-based), as well as mice (free-standing or integral with a keyboard), a stylus, touch pads, accelerometers, and microphones with accompanying voice recognition software, to name a few. The input mechanisms 120 may be separate or integral with displays 118; integral examples including gesture-sensitive displays with integrated touch-sensitive or motion-sensitive sensors.

The operating system 108 manages resources of computing device 102 and may be implemented using any suitable instruction format. For instance, the operating system 108 generally enables functionalities of the computing device 102 to access hardware and logic resources of computing device 102. Although the power manager 112 is illustrated separately from the operating system 108, it is to be appreciated that in at least some implementations, functionality of the power manager 112 may be implemented as part of the operating system 108.

The applications 110 include any suitable type of application and/or service, such as productivity applications, web browsers, media viewers, navigation applications, multimedia editing applications, and so forth. According to various implementations, the applications 110 may be implemented as locally-installed code that is executed as part of a local runtime environment. Additionally or alternatively, the applications 110 represent portals to distributed functionality, such as web services, cloud services, distributed enterprise services, and so forth.

The computing device 102 further includes a battery controller 122, which is representative of functionality to control different state conditions of the dynamic battery 122. For instance, the battery controller 122 is configured to provide various types of stimulus to the dynamic battery 116 to change an internal state of the dynamic battery 116, such as to change a power state of the dynamic battery 116. In at least some implementations, the battery controller 122 is physically and/or communicatively associated with the dynamic battery 116. Example implementations and operations of the battery controller 122 are discussed below.

Having discussed an example environment in which techniques for dynamically changing internal state of a battery may be employed, consider now some example dynamic batteries in accordance with one or more implementations.

Example Dynamic Batteries

This section describes some example dynamic batteries in accordance with one or more implementations. The example dynamic batteries, for instance, represent different example implementations of the dynamic battery 116. The illustrations of the example dynamic batteries are simplified for ease of understanding, and it is to be appreciated that the example dynamic batteries can be implemented according to a wide variety of different configurations and form factors within the spirit and scope of the claimed implementations.

Figure 2:
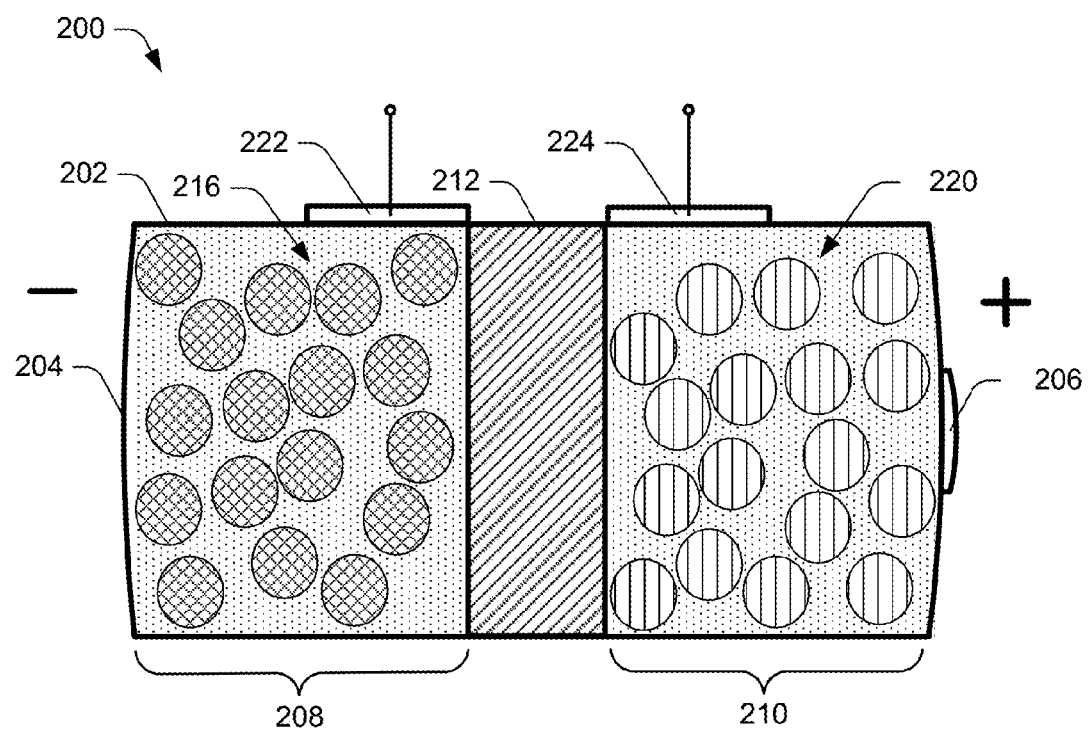
FIG. 2 illustrates a side cross-section of an example dynamic battery in accordance with one or more embodiments.
Figure 2:
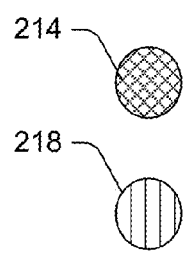

FIG. 2 illustrates a side cross-section of an example dynamic battery 200 in accordance with one or more implementations. The dynamic battery 200 includes a can 202, a negative terminal 204, and a positive terminal 206. Generally, the can 202 represents an external wrapper of the dynamic battery 200 that serves to contain internal components of the dynamic battery 200.

The internal components of the dynamic battery 200 include an anode (negative electrode) 208 and a cathode (positive electrode) 210 separated by a separator 212. The anode 208 includes anode material 214 and electrolyte 216, and the cathode 210 includes cathode material 218 and electrolyte 220. According to various implementations, the electrolyte 216 and the electrolyte 220 represent the same electrolyte, or two different types of electrolytes.

The anode material 214 represents a material to which negative ions will migrate, and the cathode material 218 represents a material to which positive ions will migrate. Generally, the separator 212 represents a physical divider that allows ions to flow between the anode 208 and the cathode 210, but prevents mixing of the anode material 214 with the cathode material 218, and mixing of the electrolyte 216 with the electrolyte 220.

The dynamic battery 200 further includes a battery controller 222 and a battery controller 224. The battery controllers 222, 224, for instance, represent implementations of the battery controller 122 introduced above. The battery controller 222 is representative of functionality to interact with components of the anode 208 to enable transitions between different operational modes, examples of which are discussed below. In at least some implementations, the battery controller 222 is communicatively connected to the power circuitry 114 and/or the power manager 112.

The battery controller 224 is representative of functionality to interact with components of the cathode 210 to enable transitions between different operational modes, examples of which are discussed below. In at least some implementations, the battery controller 224 is communicatively connected to the power circuitry 114 and/or the power manager 112. Further operational aspects of the battery controller 222 and the battery controller 224 are discussed below.

In at least some implementations, one or more of the battery controllers 222, 224 may interact with the separator 212 to cause physical and/or chemical reconfiguration of the separator 212. For instance, techniques discussed herein may be employed to activate the separator 212 to increase ion flow across the separator 212, such as to increase battery life, increase charging rate, and so forth.

Figure 3:
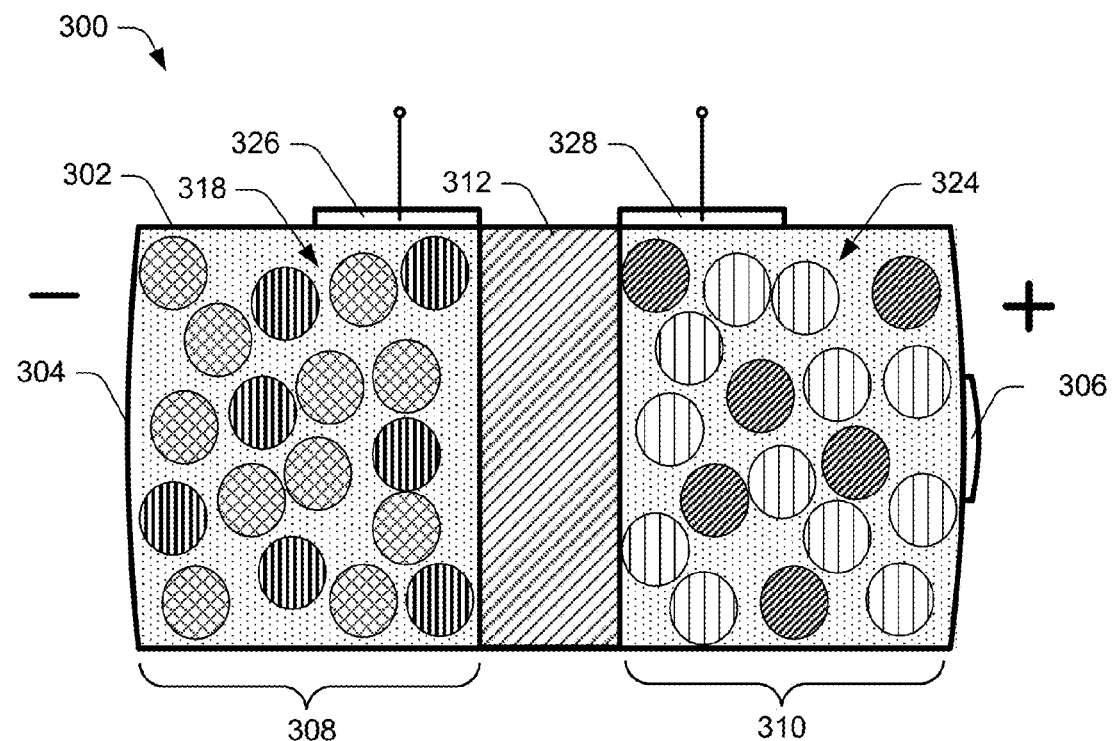
FIG. 3 illustrates a side cross-section of an example dynamic battery in accordance with one or more embodiments.
Figure 3:
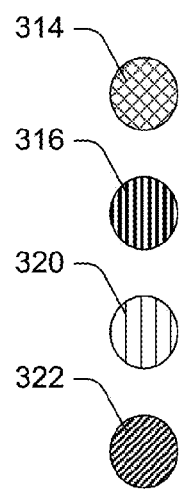

FIG. 3 illustrates a side cross-section of an example dynamic battery 300 in accordance with one or more implementations. The dynamic battery 300 includes a can 302, a negative terminal 304, and a positive terminal 306. Generally, the can 302 represents an external wrapper of the dynamic battery 300 that serves to contain internal components of the dynamic battery 300.

The internal components of the dynamic battery 300 include an anode 308 and a cathode 310 separated by a separator 312. The anode 308 includes primary anode material 314, dynamic anode material 316, and electrolyte 318. The primary anode material 314 and the dynamic anode material 316 are formed from different respective materials and generally represent materials to which negative ions will migrate. Example materials that may be used to form the primary anode material 314 include graphite, silicon, and so forth. Examples materials that may be utilized to form the dynamic anode material 316 include silicon alloys, sulfur, lithium alloys, and so forth. As further detailed below, the dynamic anode material 316 can be transitioned between different states to accommodate different operating and power scenarios.

The cathode 310 includes primary cathode material 320, dynamic cathode material 322, and cathode electrolyte 324. The primary cathode material 320 and the dynamic cathode material 322 are formed from different respective materials and generally represent materials to which positive ions will migrate. Example materials that may be used to form the primary cathode material 320 include lithium compounds (e.g., lithium cobalt oxide), nickel, and so forth. Examples materials that may be utilized to form the dynamic cathode material 322 include titanium compounds (e.g., titanium dioxide), lithium iron phosphate, and so forth. As further detailed below, the dynamic cathode material 322 can be transitioned between different states to accommodate different operating scenarios. According to various implementations, the electrolyte 318 and the electrolyte 324 represent the same electrolyte, or two different types of electrolytes.

Generally, the separator 312 represents a physical divider that allows ions to flow between the anode 308 and the cathode 310, but prevents mixing of internal components of the anode 308 with internal components of the cathode 310.

The dynamic battery 300 further includes a battery controller 326 and a battery controller 328. The battery controllers 326, 328, for instance, represent implementations of the battery controller 122 introduced above. The battery controller 326 is representative of functionality to interact with components of the anode 308 to enable transitions between different operational modes, examples of which are discussed below. In at least some implementations, the battery controller 326 is communicatively connected to the power circuitry 114 and/or the power manager 112.

The battery controller 328 is representative of functionality to interact with components of the cathode 310 to enable transitions between different operational modes, examples of which are discussed below. In at least some implementations, the battery controller 328 is communicatively connected to the power circuitry 114 and/or the power manager 112. Further operational aspects of the battery controller 326 and the battery controller 328 are discussed below.

In at least some implementations, one or more of the battery controllers 326, 328 may interact with the separator 312 to cause physical and/or chemical reconfiguration of the separator 312. For instance, techniques discussed herein may be employed to activate the separator 312 to increase ion flow across the separator 312, such as to increase battery life, increase charging rate, and so forth.

Having discussed some example dynamic batteries, consider now some example implementation scenarios in accordance with one or more implementations.

Example Implementation Scenarios

This section describes some example implementation scenarios for dynamically changing internal state of a battery in accordance with one or more implementations. Generally, the implementation scenarios are described as being implemented in the environment 100 via the computing device 102, but may be implemented in any suitable environment.

Figure 4:
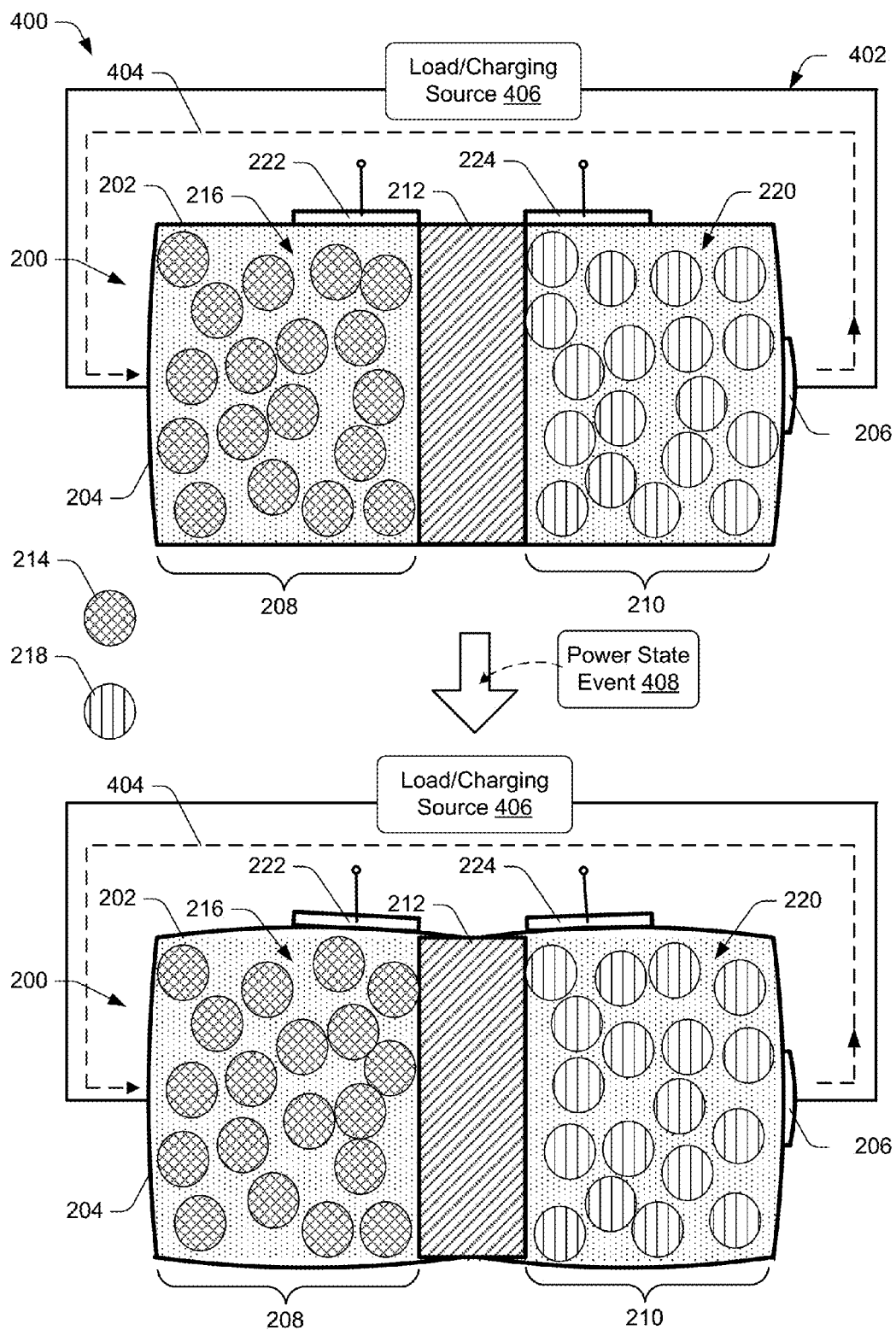
FIG. 4 depicts an example implementation scenario for changing internal state of a dynamic battery in accordance with one or more embodiments.

FIG. 4 depicts an example implementation scenario 400 for changing internal operational state of a dynamic battery in accordance with one or more implementations. The upper portion of the scenario 400 includes the dynamic battery 200 (introduced above) connected to a circuit 402 with a current flow 404 across the circuit 402. The circuit 402, for instance, represents a power supply line to power various components of the computing device 102 including a load/charging source 406 powered by and/or that provides charging power to the dynamic battery 200. Thus, the current flow 404 may alternate between representing a load current that draws current from the dynamic battery 200, and a charging current for charging the dynamic battery 200.

Proceeding to the lower portion of the scenario 400, a power state event 408 occurs to initiate a change in power state for the dynamic battery 200. According to various implementations, the power state event 408 represents a power discharge event and/or a power charge event. Examples of a power discharge event include an indication that increased discharge capacity from the dynamic battery 200 is required for the circuit 402. A power discharge event, for instance, may be generated in response to an increase in a power requirement for one or more components of the computing device 102, such as for a hardware component, a software component (e.g., an application 110), and so forth. Conversely, a power charge event may be generated in response to an indication to increase a rate at which the dynamic battery 200 charges, such as for a quick charge scenario.

In response to the power state event 408, the battery controller 222 interacts with the electrolyte 216 to cause the electrolyte 216 to swell. For instance, the battery controller 222 includes a heating apparatus that heats the electrolyte 216 such that the electrolyte 216 swells in volume. The electrolyte 216, for example, is implemented as a liquid crystal solution that swells when heated.

As another example, the battery controller 222 may include a releasable catalyst that when injected into the electrolyte 216, causes the electrolyte 216 to swell. Examples of a suitable catalyst include platinum, silicon dioxide, titanium dioxide, zeolites, and so forth. Generally, swelling of the electrolyte 216 increases the discharge capacity of the dynamic battery 200 such that effective charge life of the dynamic battery 200 is increased. For instance, causing the electrolyte 216 to swell increases the porosity of the anode 208 (e.g., of the electrolyte 216 and/or the anode material 214) such that the current flow 404 can be maintained for a longer period of time than when the electrolyte 216 is in a standard (e.g., non-swelled) state. In a charging scenario, increasing the porosity of the anode 208 increases the rate at which the dynamic battery 200 charges, such as to accommodate a quick charge scenario.

Optionally or additionally to the anode 208, the battery controller 224 can cause the electrolyte 220 to swell in a similar manner as the anode 208 to increase the discharge capacity of the cathode 210.

Consider, for instance, a scenario where the electrolyte 216 and/or the electrolyte 220 are implemented as a liquid crystal material. In such a scenario, activation of the liquid crystal material causes a phase change in the liquid crystal to increase ion permeability of the dynamic anode material 602. Increasing the ion permeability promotes ion flow across the dynamic battery 200 and increases the discharge capacity (e.g., charge life) and/or charging rate of the dynamic battery 200.

In at least some implementations, swelling of the electrolyte 216 and/or the electrolyte 220 causes the dynamic battery 200 to swell in size. Accordingly, in one or more implementations the computing device 102 is configured to accommodate physical swelling of the dynamic battery 200, such as via flexibility of the computing device 102 to swell with the dynamic battery 200, and/or additional space surrounding the dynamic battery to accommodate the swelling.

According to various implementations, a further power state event may be generated to cause the dynamic battery 200 to return to a normal operational mode. For instance, in response to the further power state event, the battery controller 222 may stop heating the electrolyte 216 such that the electrolyte 216 contracts, e.g., is no longer swollen. Similarly, the battery controller 224 may stop heating the electrolyte 220 such that the electrolyte 220 contracts. For instance, in response to the further power state event, the dynamic battery 200 returns to the state illustrated in the upper portion of the scenario 400.

Figure 5:
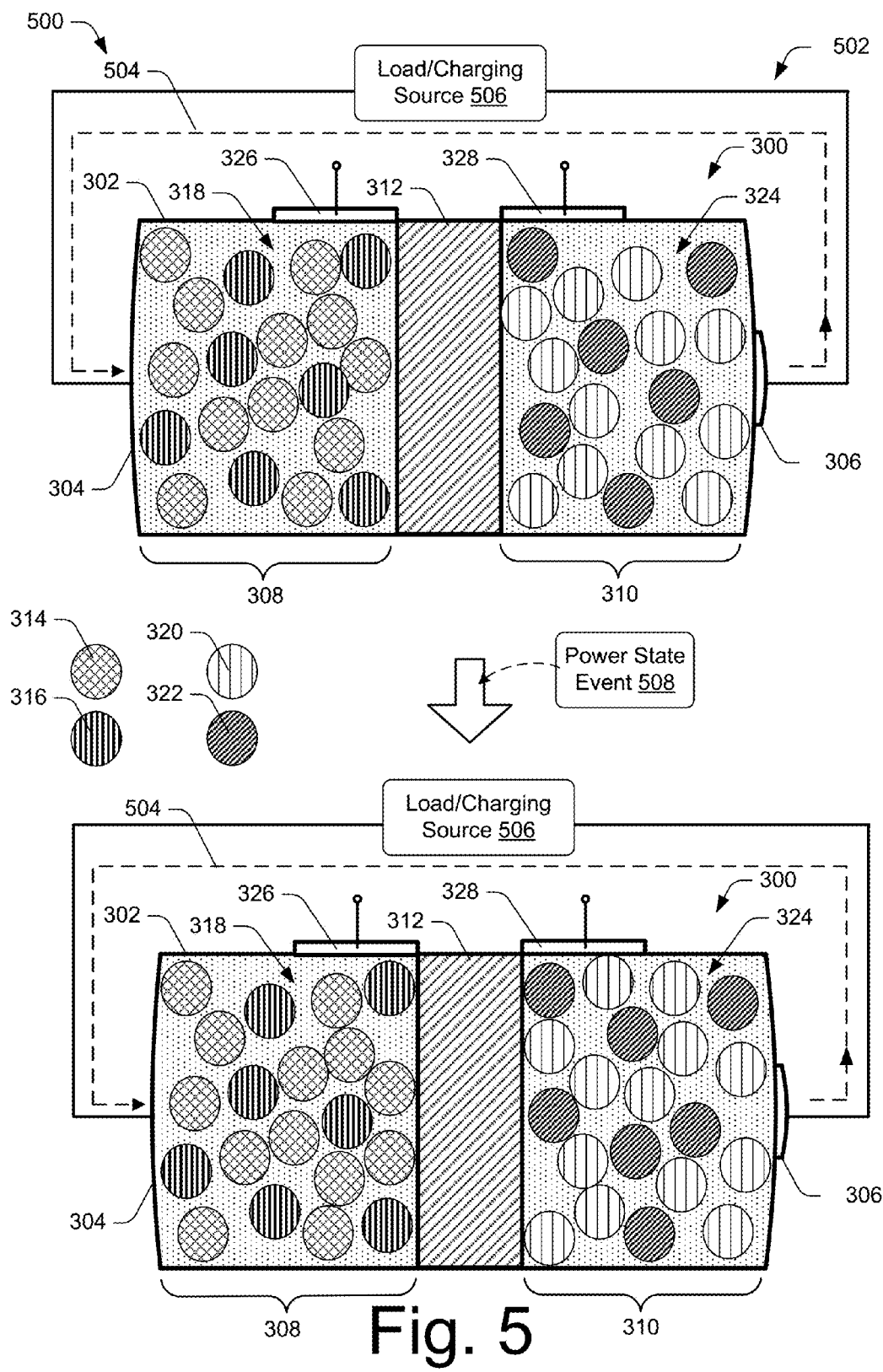
FIG. 5 depicts an example implementation scenario for changing internal state of a dynamic battery in accordance with one or more embodiments.

FIG. 5 depicts an example implementation scenario 500 for changing operational state of a dynamic battery in accordance with one or more implementations. The scenario 500, for instance, represents an alternative and/or additional implementation to the scenario 400 discussed above.

The upper portion of the scenario 500 includes the dynamic battery 300 (introduced above) connected to a circuit 502 with a current flow 504 across the circuit 502. The circuit 502, for instance, represents a power supply line to power various components of the computing device 102 including a load/charging source 506 powered by and/or that provides charging power to the dynamic battery 300. Thus, the current flow 504 may alternate between representing a load current that draws power from the dynamic battery 300, and a charging current for charging the dynamic battery 300.

In the upper portion of the scenario 500, the dynamic battery 300 is in a standard operating state. In the standard operating state, current flow across the circuit 502 is based primarily on electrical activity of the primary anode material 314 and the primary cathode material 320. For instance, in the primary operating state, most or all of the ion exchange for the dynamic battery 300 occurs across the primary anode material 314 and the primary cathode material 320. Further, in the primary operating state, the dynamic anode material 316 and the dynamic cathode material 322 are in an inactive state such that little or no ion exchange occurs across the dynamic anode material 316 and the dynamic cathode material 322.

Proceeding to the lower portion of the scenario 500, a power state event 508 occurs to initiate a change in power state for the dynamic battery 300. According to various implementations, the power state event 508 represents a power discharge event and/or a power charge event. Examples of different power state events are discussed elsewhere herein.

Responsive to the power state event 508, the battery controller 326 activates the dynamic anode material 316. For instance, the battery controller 326 provides a stimulus to activate the dynamic anode material 316. In one example, the battery controller 326 heats the anode 308, causing heat activation of the dynamic anode material 316. In another example, the battery controller 326 causes a catalyst to be released into the anode 308, which activates the dynamic anode material 316. Examples of a suitable catalyst include platinum, silicon dioxide, titanium dioxide, zeolites, and so forth. Other types of activation stimulus may be additionally or alternatively employed, such as high frequency radio frequency (RF) wave activation, magnetic activation, mechanical activation (e.g., battery vibration), light activation (e.g., using infrared, ultraviolet, and so on), and so forth.

Further to the scenario 500, activation of the dynamic anode material 316 causes an increase in ion flow and/or electrical conductivity across the dynamic anode material 316. For instance, in the standard operating state discussed above, little or no ion flow and/or electrical conductivity occurs across the dynamic anode material 316. When activated, however, ion flow and/or electrical conductivity across the dynamic anode material 316 increases. This increase in ion flow and/or electrical conductivity increases the discharge capacity (e.g., effective discharge lifetime) of the dynamic battery 300. Further, the increase in ion flow and/or electrical conductivity increases a rate at which the dynamic anode material 316 is charged in a battery charging scenario.

According to various implementations, similar activity occurs in the cathode 310. For instance, the cathode controller 320 causes activation of the dynamic cathode material 322 such that ion flow and/or electrical conductivity across the dynamic cathode material 322 increases. Example ways of activation are discussed above.

As an additional or alternative implementation to the stimulus discussed above, activation of the dynamic anode material 316 and/or the dynamic cathode material 322 may occur incidentally in response to a voltage drop across the dynamic battery 300 such as may occur in a high power usage scenario. For instance, the dynamic anode material 316 may have a higher electrical potential than the primary anode material 314 such that during normal load scenarios, little or no ion flow and/or electrical conductivity occurs across the dynamic anode material 316. When power usage increases (e.g., the power state event 508) such that voltage of the dynamic battery 300 decreases, activation of the dynamic anode material 316 occurs.

Similarly, the dynamic cathode material 322 may have a lower electrical potential than the primary cathode material 320 such that during normal load scenarios, little or no ion flow and/or electrical conductivity occurs across the dynamic cathode material 320. When power usage increases (e.g., the power state event 508) such that voltage of the dynamic battery 300 decreases, activation of the dynamic cathode material 322 occurs.

According to various implementations, activation of the dynamic anode material 316 and/or the dynamic cathode material 322 enables the dynamic battery 300 to utilize both the primary materials and the dynamic materials for the power flow 504 across the circuit 502.

Figure 6:
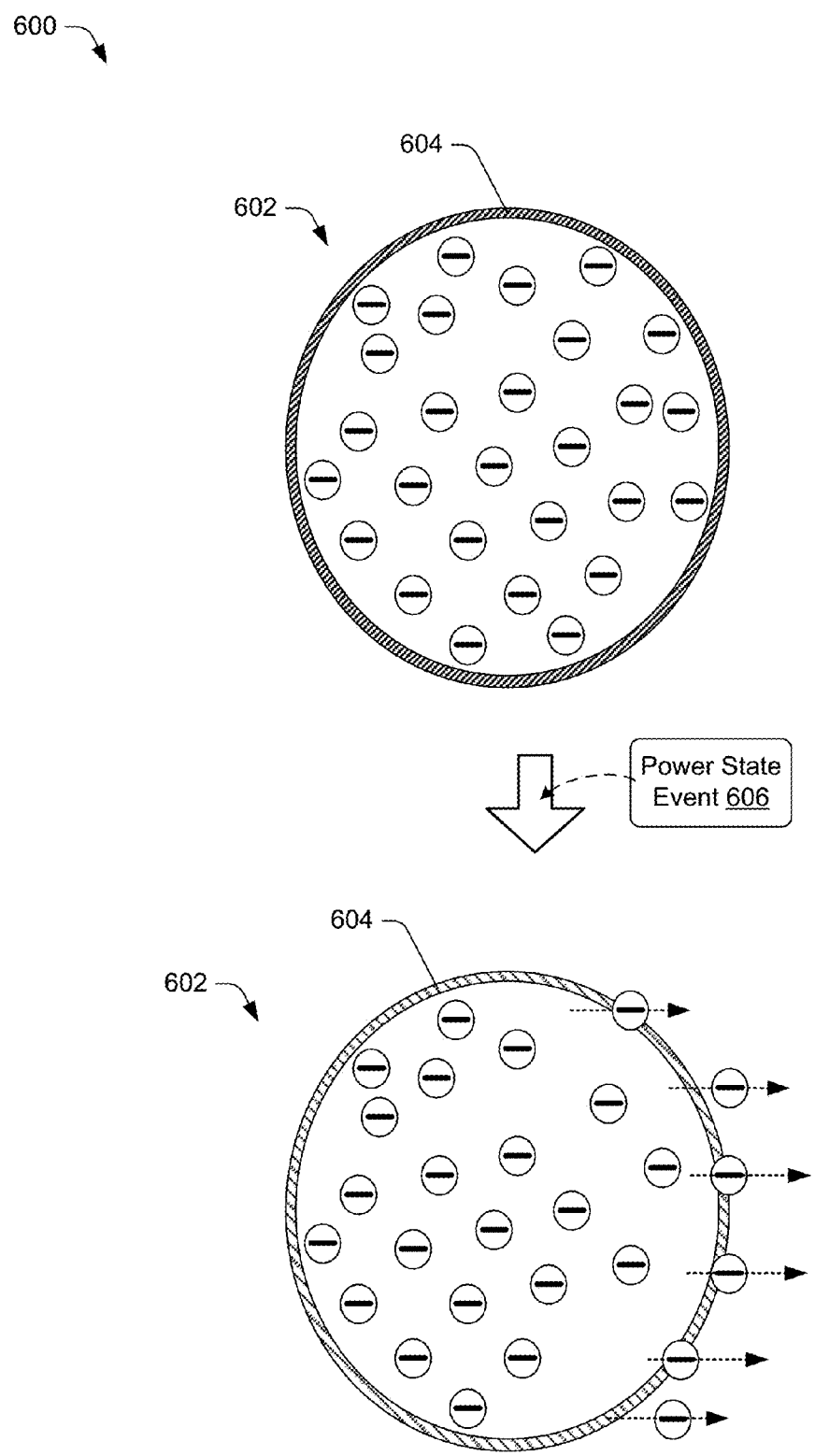
FIG. 6 depicts an example implementation scenario for activation of a dynamic battery material in accordance with one or more embodiments.

FIG. 6 depicts an example implementation scenario 600 for activation of a dynamic battery material in accordance with one or more implementations. The scenario 600, for instance, illustrates details of the scenario 500 discussed above.

The upper portion of the scenario 600 includes a dynamic anode material 602, which represents an instance of the dynamic anode material 316 introduced above. In the upper portion of the scenario 600, the dynamic anode material 602 is in an inactive state such that little or no flow of negative ions and/or electrons occurs across an external surface 604 of the dynamic anode material 600. For instance, the upper portion of the scenario 600 represents the dynamic anode material 602 in a standard operating state, aspects of which are detailed above.

Continuing to the lower portion of the scenario 600, a power state event 606 occurs that causes activation of the dynamic anode material 602. Examples of the power state event 606 and ways of activating the dynamic anode material 602 are discussed above. In response to activation, ion flow and/or electrical conductivity across the external surface 604 increases. As discussed above, this increase in ion flow and/or electrical conductivity enables the dynamic battery 300 to experience increased battery life in comparison with a scenario where the dynamic anode material 602 is inactive.

In at least some implementations, activation of the dynamic anode material 602 changes a crystalline structure of a crystalline surface of the anode material 602 (e.g., of the external surface 604) to alter its ion permeability and/or electrical conductivity. For instance, in an inactive state, the external surface 604 is ion impermeable and/or less ion permeable than in an active state, and may be electrically insulating. When the dynamic anode material 602 is activated, the ion permeability and/or electrical conductivity of the external surface 604 is increased such that ions and/or electrons flow across the dynamic anode material 602 for battery discharge and/or charging scenarios.

For example, consider a scenario where the dynamic anode material 602 is implemented as a nanoscale material, such as nanoparticles, nanotubes, and so forth. The nanoscale material may be doped with a magnetic material, such as magnetite. In such as a scenario, ion and/or electron conductivity of the dynamic anode material 602 is controllable by changing particle orientation. For instance, in an inactive state, the particles of the dynamic anode material 602 are arranged such that there is little or no ion and/or electron conductivity across the dynamic anode material 602. When activated, however, particles of the dynamic anode material 602 are reoriented such that ion and/or electron conductivity across the dynamic anode material is increased.

Although the scenario 600 is discussed with reference to a dynamic anode material, it is to be appreciated that in additional or alternative scenarios, a similar situation and attributes apply for a dynamic cathode material. For instance, permeability and/or conductivity of the dynamic cathode material 322 may be increased by activating the dynamic cathode material.

As an alternative or additional implementation, activation of the dynamic battery 300 may include electrolyte exchange. For instance, one or more of the battery controllers 326, 328 may withdraw some or all of the electrolytes 318, 324, and may inject a different electrolyte such that the dynamic battery 300 is activated according to techniques discussed herein.

Accordingly, the scenarios 400-600 illustrate that techniques discussed herein may leverage various battery configurations to accommodate changes in power requirements and different power scenarios.

Having discussed some example implementation scenarios for dynamically changing internal state of a battery, consider now some example procedures in accordance with one or more implementations.

Example Procedure

This section describes an example procedure for dynamically changing internal state of a battery in accordance with one or more implementations. The procedure is shown as a set of operations (or acts) performed, such as through one or more entities or modules, and is not necessarily limited to the order shown for performing the operation. The example procedure may be employed in the environment 100 of FIG. 1, the system 8 of FIG. 8, and/or any other suitable environment. According to one or more implementations, the procedure describes an example way for performing various aspects of the example implementation scenarios described above. In at least some implementations, steps described for the procedure are implemented automatically and independent of user interaction.

Figure 7:
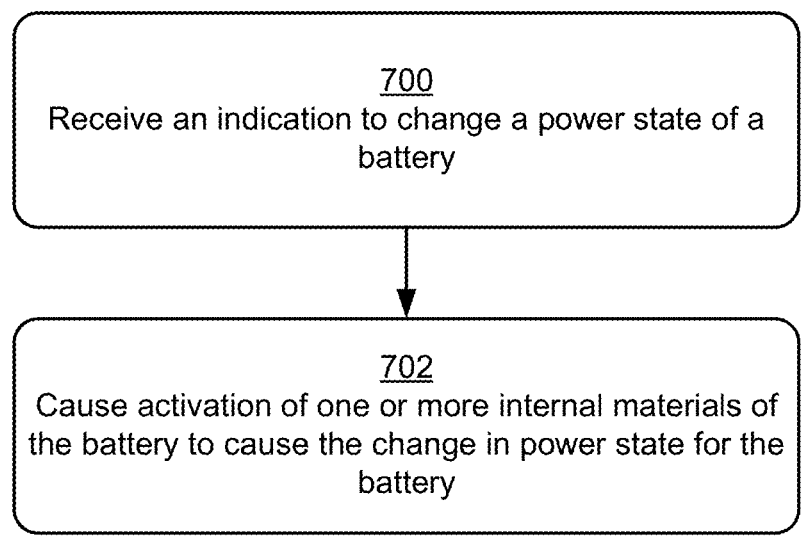
FIG. 7 is a flow diagram that describes steps in a method for changing internal state of a battery in accordance with one or more embodiments.

FIG. 7 is a flow diagram that describes steps in a method in accordance with one or more embodiments. The method, for instance, describes an example procedure for changing internal power state of a battery in accordance with one or more embodiments.

Step 700 receives an indication to change a power state of a battery. With regard to the environment 100, for instance, the indication indicates an increased power requirement for the computing device 102. The increased power requirement may result from various scenarios. Generally, the indication to change the power state corresponds to one or more of a battery discharge event for discharging power from the battery, and/or a battery charge event for charging the battery. For instance, an application 110 may require extra battery life to continue running. As another example, a hardware functionality may require extra battery life, such as a position detection device (e.g., for Global Positioning System (GPS) data), a wireless radio, the display 118, and so forth.

As another example, the change in power state may correspond to a battery charge event, such as for a quick charge scenario.

Step 702 causes activation of one or more internal materials of the battery to cause the change in power state for the battery. Example ways of changing power state of a battery are detailed above, and generally include heating an internal component of a battery (e.g., an electrolyte), releasing a catalyst to activate an internal component of a battery, providing external and/or internal stimulus to activate an internal component of a battery, and so forth.

In at least some implementations, the example procedure may be performed by the power manager 112, one or more of the battery controllers discussed above, and/or interaction between the power manager 112 and the battery controllers.

Having discussed an example procedure for dynamically changing internal state of a battery, consider now a discussion of an example system and device for performing various aspects of the procedure and implementation scenarios for dynamically changing internal state of a battery in accordance with one or more implementations.

Example System and Device

Figure 8:
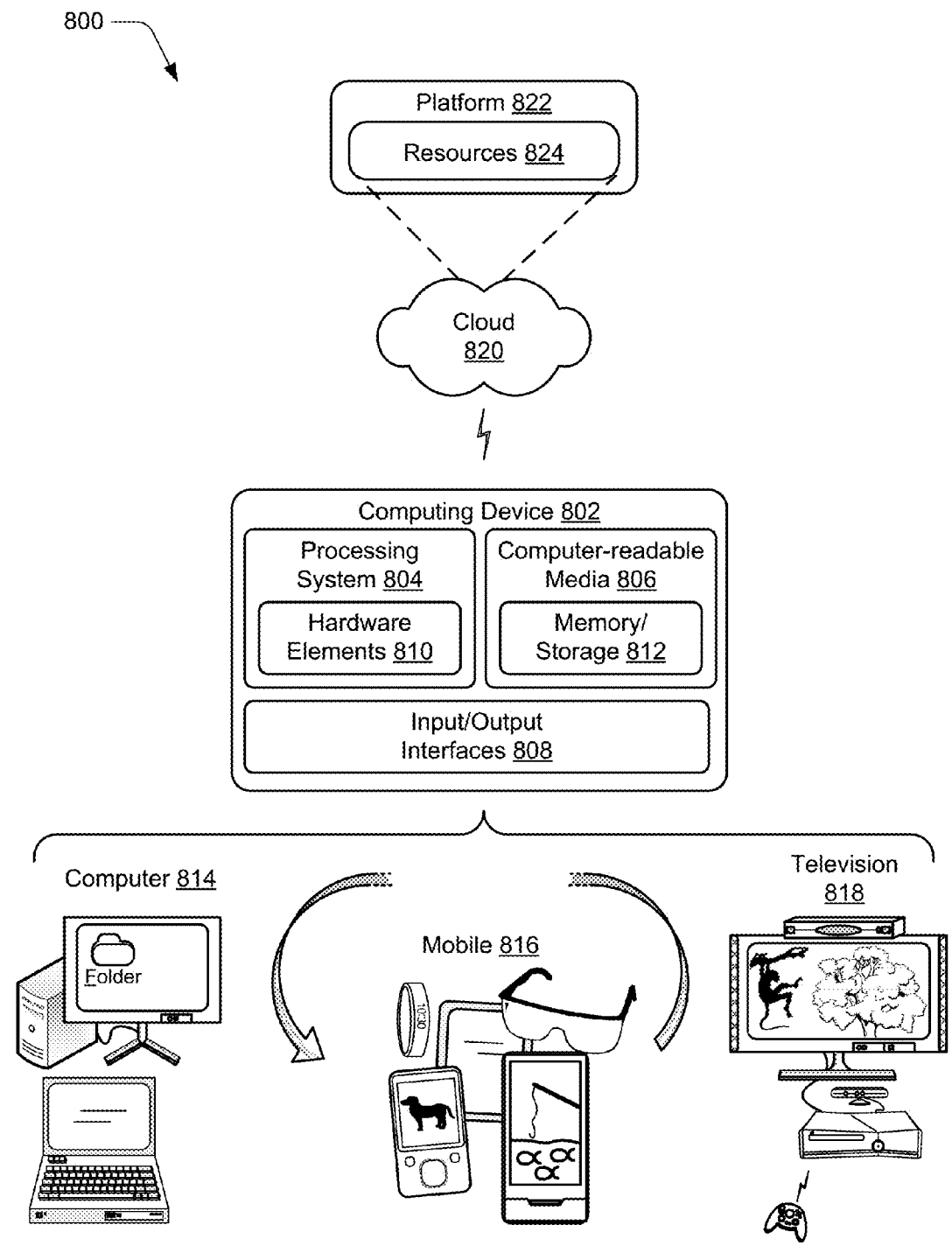
FIG. 8 illustrates an example system and computing device as described with reference to FIG. 1, which are configured to implement embodiments of techniques described herein.

FIG. 8 illustrates an example system generally at 800 that includes an example computing device 802 that is representative of one or more computing systems and/or devices that may implement various techniques described herein. For example, the computing device 102 discussed above with reference to FIG. 1 can be embodied as the computing device 802. The computing device 802 may be, for example, a server of a service provider, a device associated with the client (e.g., a client device), an on-chip system, and/or any other suitable computing device or computing system.

The example computing device 802 as illustrated includes a processing system 804, one or more computer-readable media 806, and one or more Input/Output (I/O) Interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules that are executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a wearable device, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. For example, functionalities discussed with reference to the computing device 102 may be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100 and/or the system 800.

Example implementations discussed herein include:

EXAMPLE 1

A dynamic battery including: a positive electrode, a negative electrode, and a separator separating the positive electrode from the negative electrode, at least one of the positive electrode or the negative electrode including a primary electrode material and a dynamic electrode material different from the primary electrode material, the dynamic electrode material being activatable to change a power state of the dynamic battery.

EXAMPLE 2

The dynamic battery of example 1, wherein the dynamic battery is associated with a standard operating mode and an activated operating mode, wherein in the standard operating mode the primary electrode material is active and the dynamic electrode material is inactive, and in the activated operating mode the dynamic electrode material is active.

EXAMPLE 3

The dynamic battery of one or more of examples 1 or 2, wherein the dynamic battery is associated with a standard operating mode and an activated operating mode, wherein in the standard operating mode the dynamic electrode material is inactive such that one or more of ion flow or electrical conductivity across the dynamic electrode material is less than one or more of ion flow or electrical conductivity in the activated operating mode.

EXAMPLE 4

The dynamic battery of one or more of examples 1-3, wherein the dynamic electrode material is activatable in response to an external stimulus applied to the dynamic battery.

EXAMPLE 5

The dynamic battery of one or more of examples 1-4, wherein the dynamic electrode material is activatable in response to an external stimulus applied to the dynamic battery, the external stimulus including one or more of a catalyst applied to the dynamic electrode material, heating of the dynamic electrode material, mechanical activation, or radio wave activation.

EXAMPLE 6

The dynamic battery of one or more of examples 1-5, wherein the dynamic electrode material is activatable in response to a voltage drop in the dynamic battery.

EXAMPLE 7

The dynamic battery of one or more of examples 1-6, wherein activation of the dynamic electrode material causes the dynamic electrode material to transition from an inactive state to an active state, and wherein in the active state a discharge capacity of the dynamic battery is greater than in the inactive state.

EXAMPLE 8

The dynamic battery of one or more of examples 1-7, wherein the dynamic battery powers one or more components of a computing device, and wherein the dynamic electrode material is activatable in response to a power state event generated by the computing device.

EXAMPLE 9

The dynamic battery of one or more of examples 1-8, wherein the dynamic battery powers one or more components of a computing device, and wherein the dynamic electrode material is activatable in response to a power state event generated by the computing device, the power state event including one or more of a battery discharge-related event or a battery charge-related event.

EXAMPLE 10

The dynamic battery of one or more of examples 1-9, wherein the dynamic battery powers one or more components of a computing device, and wherein the dynamic electrode material is activatable in response to an application-related event generated by the computing device.

EXAMPLE 11

An apparatus including: a battery including an anode, a cathode, one or more electrolytes, and a separator separating the anode from the cathode; and a battery controller configured to cause heating of the one or more electrolytes to change a power state of the battery.

EXAMPLE 12

The apparatus of example 11, wherein the battery provides power for one or more components of a computing device, and wherein the battery controller is configured to causing heating of the one or more electrolytes in response to a power event generated by the computing device.

EXAMPLE 13

The apparatus of one or more of examples 11 or 12, wherein the battery provides power for one or more components of a computing device, and wherein the battery controller is configured to causing heating of the one or more electrolytes in response to an application-related event generated by the computing device.

EXAMPLE 14

The apparatus of one or more of examples 11-13, wherein the battery provides power for one or more components of a computing device, and wherein the battery controller is configured to causing heating of the one or more electrolytes in response to a power event generated by the computing device, the power event including one or more of a battery discharge-related event or a battery charge-related event.

EXAMPLE 15

The apparatus of one or more of examples 11-14, wherein heating of the one or more electrolytes causes the electrolyte to swell to increase a porosity of one or more of the anode or the cathode such that a discharge capacity of the battery is increased.

EXAMPLE 16

The apparatus of one or more of examples 11-15, wherein heating of the one or more electrolytes causes the electrolyte to swell to increase a porosity of one or more of the anode or the cathode such that a charging rate of the battery is increased.

EXAMPLE 17

A system including: one or more processors; and one or more computer-readable storage media storing instructions that are executable by the one or more processors to perform operations including: receiving an indication to change a power state of a battery; and causing activation of one or more internal materials of the battery to cause the change in power state for the battery.

EXAMPLE 18

The system of example 17, wherein the battery powers one or more components of a computing device, and the indication to change the power state occurs in response to an increase in a power requirement of a computing device.

EXAMPLE 19

The system of one or more of examples 17 or 18, wherein the one or more internal materials include an electrolyte, and wherein said causing activation includes causing the electrolyte to be heated to increase a discharge capacity of the battery.

EXAMPLE 20

The system of one or more of examples 17-19, wherein the one or more internal materials include an electrode material, and wherein said causing activation includes causing a catalyst to be released within the battery to activate the electrode material and increase a discharge capacity of the battery.

CONCLUSION

Although embodiments of techniques and apparatuses dynamically changing internal state of a battery have been described in language specific to features and/or methods, it is to be understood that the subject of the appended claims is not necessarily limited to the specific features or methods described. Rather, the specific features and methods are disclosed as example implementations for dynamically changing internal state of a battery.

What is claimed is:

1. A dynamic battery comprising:
   a positive electrode, a negative electrode, and a separator separating the positive electrode from the negative electrode, at least one of the positive electrode or the negative electrode including a primary electrode material and a dynamic electrode material different from the primary electrode material, the dynamic electrode material being activatable to change a power state of the dynamic battery,
   the dynamic battery configured to operate in a standard operating mode during which the dynamic battery supplies power to an external circuit and ion exchange for the dynamic battery occurs primarily across the primary electrode material relative to the dynamic electrode material, and configured to operate in an activated operating mode in response to an external stimulus being applied to activate the dynamic electrode material while the dynamic battery supplies power to the external circuit, the activated operating mode causing an increase in discharge capacity of the dynamic battery relative to the standard operating state.

2. A dynamic battery as recited in claim 1, wherein in the standard operating mode the primary electrode material is active and the dynamic electrode material is inactive, and in the activated operating mode the dynamic electrode material is active.

3. A dynamic battery as recited in claim 1, wherein in the standard operating mode the dynamic electrode material is inactive such that one or more of ion flow or electrical conductivity across the dynamic electrode material is less than one or more of ion flow or electrical conductivity in the activated operating mode.

4. A dynamic battery as recited in claim 1, wherein the external stimulus comprises one or more of a catalyst applied to the dynamic electrode material, heating of the dynamic electrode material, mechanical activation, or radio wave activation.

5. A dynamic battery as recited in claim 1, wherein the dynamic electrode material is activatable in response to a voltage drop in the dynamic battery.

6. A dynamic battery as recited in claim 1, wherein activation of the dynamic electrode material causes the dynamic electrode material to transition from an inactive state to an active state, and wherein in the active state a discharge capacity of the dynamic battery is greater than in the inactive state.

7. A dynamic battery as recited in claim 1, wherein the dynamic battery powers one or more components of a computing device, and wherein the dynamic electrode material is activatable in response to a power state event generated by the computing device.

8. A dynamic battery as recited in claim 1, wherein the dynamic battery powers one or more components of a computing device, and wherein the dynamic electrode material is activatable in response to a power state event generated by the computing device, the power state event comprising one or more of a battery discharge-related event or a battery charge-related event.

9. A dynamic battery as recited in claim 1, wherein the dynamic battery powers one or more components of a computing device, and wherein the dynamic electrode material is activatable in response to an application-related event generated by the computing device.

10. A dynamic battery comprising:
    a positive electrode, a negative electrode, and a separator separating the positive electrode from the negative electrode, at least one of the positive electrode or the negative electrode including a primary electrode material and a dynamic electrode material different from the primary electrode material, the dynamic electrode material configured to change a power state of the dynamic battery by changing, in response to activation of the dynamic electrode material during a battery discharge scenario, one or more of a crystalline structure or an electrical conductivity of the dynamic electrode material.

11. A dynamic battery as recited in claim 10, wherein the dynamic battery includes a standard operating mode and an activated operating mode, and wherein in the standard operating mode the primary electrode material is active and the dynamic electrode material is inactive, and in the activated operating mode the dynamic electrode material is active.

12. A dynamic battery as recited in claim 10, wherein the dynamic battery includes a standard operating mode and an activated operating mode, and wherein in the standard operating mode the dynamic electrode material is inactive such that one or more of ion flow or electrical conductivity across the dynamic electrode material is less than one or more of ion flow or electrical conductivity in the activated operating mode.

13. A dynamic battery as recited in claim 10, wherein the dynamic electrode material is activatable in response to an externally applied stimulus.

14. A dynamic battery as recited in claim 10, wherein the dynamic electrode material is activatable in response to an externally applied stimulus, the external stimulus including one or more of a catalyst applied to the dynamic electrode material, heating of the dynamic electrode material, mechanical activation, or radio wave activation.

15. A dynamic battery as recited in claim 10, wherein activation of the dynamic electrode material increases an ion permeability of the dynamic electrode material.

16. A dynamic battery as recited in claim 10, wherein activation of the dynamic electrode material causes a phase change in the dynamic electrode material.

17. A dynamic battery as recited in claim 10, wherein the dynamic electrode material comprises a nanoscale material doped with magnetic material.

18. A dynamic battery comprising:
a positive electrode, a negative electrode, and a separator separating the positive electrode from the negative electrode, at least one of the positive electrode or the negative electrode including a primary electrode material and a dynamic electrode material different from the primary electrode material, the dynamic electrode material being activatable to change a power state of the dynamic battery,
the dynamic battery configured to operate in a standard operating state during which the dynamic battery supplies power to an external circuit and ion exchange for the dynamic battery occurs primarily across the primary electrode material relative to the dynamic electrode material, and configured to operate in an activated operating state in response to an external stimulus being applied to activate the dynamic electrode material while the dynamic battery supplies power to the external circuit.

19. A dynamic battery as recited in claim 18, wherein the activated operating state increases a discharge capacity of the dynamic battery.

20. A dynamic battery as recited in claim 18, wherein the external stimulus comprises externally applied heating of the dynamic electrode material.

* * * * *